United States Patent
Shan

(10) Patent No.: US 11,432,135 B2
(45) Date of Patent: Aug. 30, 2022

(54) VEHICLE-TO-EVERYTHING (V2X) CONTROL FUNCTION BASED ON USER EQUIPMENT (UE) CAPABILITY

(71) Applicant: Apple Inc., Cupertino, CA (US)

(72) Inventor: Changhong Shan, Portland, OR (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 16/431,419

(22) Filed: Jun. 4, 2019

(65) Prior Publication Data

US 2019/0289459 A1 Sep. 19, 2019

Related U.S. Application Data

(60) Provisional application No. 62/687,029, filed on Jun. 19, 2018.

(51) Int. Cl.

| | |
|---|---|
| H04W 8/24 | (2009.01) |
| H04W 4/40 | (2018.01) |
| H04W 76/25 | (2018.01) |
| H04W 60/00 | (2009.01) |
| H04W 8/08 | (2009.01) |
| H04M 15/00 | (2006.01) |

(52) U.S. Cl.
CPC ............ *H04W 8/24* (2013.01); *H04M 15/66* (2013.01); *H04W 4/40* (2018.02); *H04W 8/08* (2013.01); *H04W 60/00* (2013.01); *H04W 76/25* (2018.02)

(58) Field of Classification Search
CPC ......... H04W 8/24; H04W 4/40; H04W 76/25; H04W 60/00; H04W 8/08; H04W 76/14; H04W 4/24; H04M 15/66; H04M 15/00; H04L 12/14; H04L 12/1403
See application file for complete search history.

(56) References Cited

U.S. PATENT DOCUMENTS

| | | | | |
|---|---|---|---|---|
| 10,517,110 | B2* | 12/2019 | Dinan | H04W 4/70 |
| 2019/0037448 | A1* | 1/2019 | Shan | H04W 4/48 |
| 2019/0090107 | A1* | 3/2019 | Kim | H04W 80/08 |
| 2019/0116520 | A1* | 4/2019 | Chaponniere | H04W 72/042 |
| 2019/0313359 | A1* | 10/2019 | Lee | H04W 4/12 |
| 2019/0313469 | A1* | 10/2019 | Karampatsis | H04W 36/04 |
| 2020/0112841 | A1* | 4/2020 | Kim | H04W 8/06 |

(Continued)

FOREIGN PATENT DOCUMENTS

WO  WO-2019157961 A1 * 8/2019 ............. H04W 4/46

OTHER PUBLICATIONS

Motorola Mobility, Lenovo, UE Policy management (Discussion) Nov. 27-Dec. 1, 2017, SA WG2 Meeting #124, S2-178546 (Year: 2017).*

(Continued)

*Primary Examiner* — Christopher P Grey
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for determining a capability of a UE for supporting vehicle-to-everything (V2X) communication over a PC5 interface, and determining at least a V2X policy and V2X parameters for the UE based on the capability of the UE for supporting V2X communication. Other embodiments may be described and claimed.

23 Claims, 15 Drawing Sheets

(56) References Cited

U.S. PATENT DOCUMENTS

2020/0178048 A1* 6/2020 Kim .................. H04W 4/40

OTHER PUBLICATIONS

3GPP, "Technical Specification Group Services and System Aspects; Architecture enhancements for V2X services (Release 15)," 3GPP TS 23.285 V15.1 0 (Jun. 2018), 5G, 36 pages.
3GPP, "Technical Specification Group Core Network and Terminals; User Equipment (UE) to V2X control function; protocol aspects; Stage 3 (Release 14)," 3GPP TS 24.386 V14.3.0 (Dec. 2017), Lte Advanced Pro, 35 pages.
3GPP, "Technical Specification Group Core Network and Terminals; V2X Control Function to V2X Application Server Aspects; Stage 3 (Release 14)," 3GPP TS 29.387 V0.1.0 (Oct. 2016), Lte Advanced Pro, 7 pages.

* cited by examiner

VEHICLE-TO-EVERYTHING (V2X) CONTROL FUNCTION BASED ON USER EQUIPMENT (UE) CAPABILITY

CROSS REFERENCE TO RELATED APPLICATION

The present application claims priority from U.S. Provisional Patent Application No. 62/687,029, filed Jun. 19, 2018, and entitled "VEHICLE-TO-EVERYTHING (V2X) CONTROL FUNCTION TO PROVISION THE ACCORDING POLICY AND PARAMETER TO USER EQUIPMENT (UE) BASED ON THE USER EQUIPMENT (UE) CAPABILITY INDICATION," the entire disclosure of which is hereby incorporated by reference in its entireties.

FIELD

Embodiments of the present invention relate generally to the technical field of wireless communications.

BACKGROUND

Mobile communication has evolved significantly from early voice systems to today's highly sophisticated integrated communication platform. The next generation wireless communication system, which may be referred to as 5G or new radio (NR), may provide access to information in sharing of data anywhere, any time by various users and applications. NR is expected to be a unified network/system that meets vastly different and sometimes conflicting performance dimensions and services. Such diverse multi-dimensional requirements may be driven by different services and applications. In general, NR will evolve based on $3^{rd}$ Generation Partnership Project (3GPP) LTE-Advanced with additional potential new Radio Access Technologies (RATs) to improve wireless connectivity solutions. NR may enable ubiquitous wireless connections the deliver fast and Rich content in services.

Furthermore, vehicle-to-everything (V2X) communication systems may facilitate the communication from a vehicle to any entity that may affect the vehicle, and vice versa. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). There are two types of V2X communication technology depending on the underlying technology being used: WLAN-based, and cellular-based.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
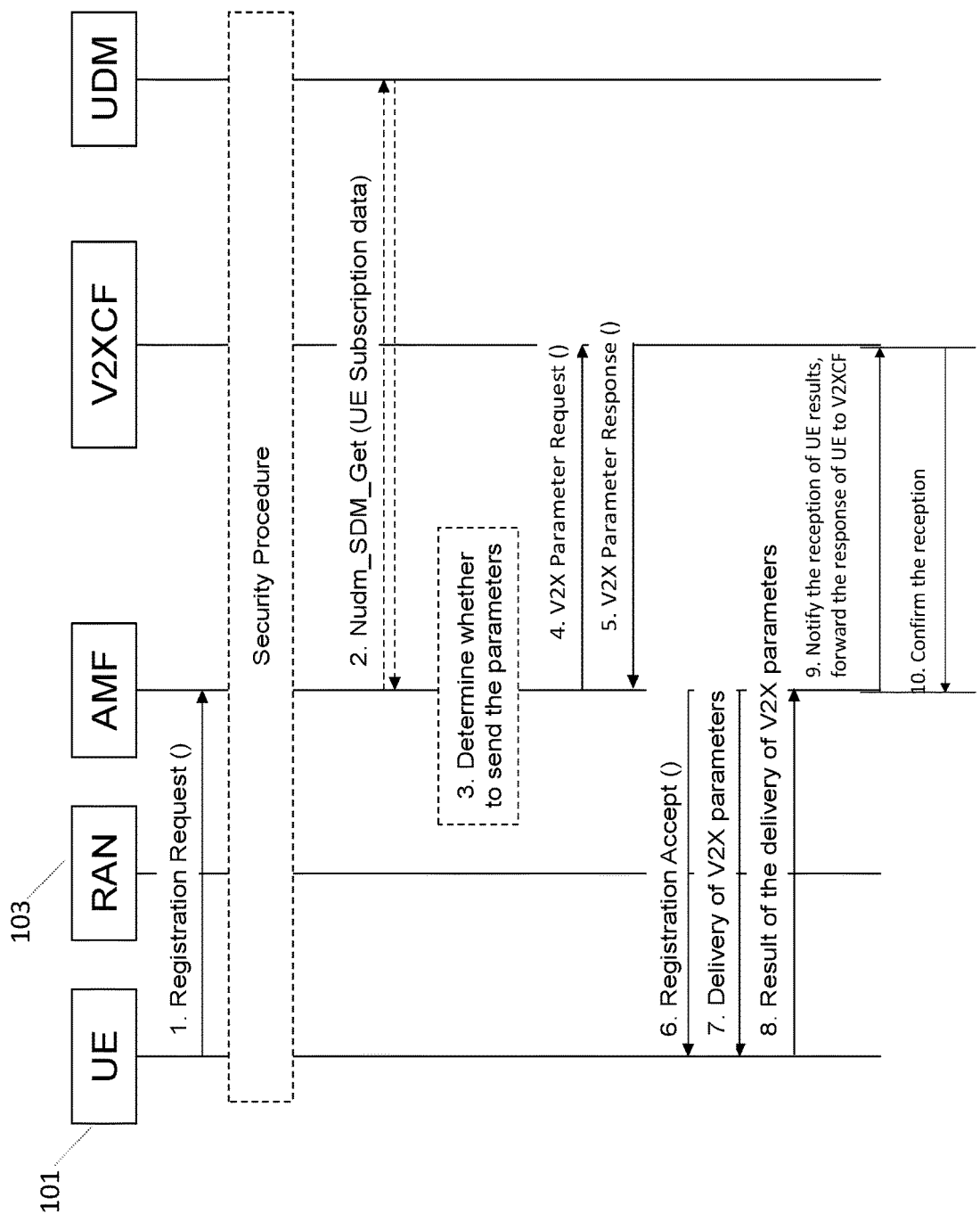
FIG. 1 illustrates an example of various entities and their operations in a vehicular communication system, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

In general, new radio (NR) will evolve based on $3^{rd}$ Generation Partnership Project (3GPP) LTE-Advanced with additional potential new Radio Access Technologies (RATs) to enrich people lives with better, simple and seamless wireless connectivity solutions. NR may enable everything connected by wireless and deliver fast, rich contents and services. Vehicle-to-everything (V2X) communication systems may facilitate the communication from a vehicle to any entity that may affect the vehicle, and vice versa. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). There are two types of V2X communication technology depending on the underlying technology being used: WLAN-based, and cellular-based.

The vehicle-to-everything (V2X) Control Function may have the policy/parameters for V2X communication over PC5 and Uu/NG-Uu for both Evolved UMTS Terrestrial Radio Access (E-UTRA) and NR based on subscription, but the user equipment (UE) does not have to support both E-UTRA and NR based V2X communication over PC5 and Uu/NG-Uu, which means the corresponding policy/parameters are useless for UE and may overload the communication between UE and V2X Control Function if the policy/parameters sent to UE are not supported by UE.

In various embodiments, a UE indicates its capability of supporting V2X communication over E-UTRA PC5 or NR PC5 and/or V2X communication over Uu (E-UTRA) or NG-Uu (NR) to a V2X Control Function. The V2X Control Function may then decide, based on the UE capability indication and available subscription information, whether to provision the corresponding V2X policy/parameters to UE.

Provisioning of Parameters for V2X Configuration

V2X communication is configured by the V2X configuration parameters. The V2X configuration parameters may include configuration parameters for V2X provisioning; configuration parameters for V2X communication over the PC5 interface; and configuration parameters for V2X communication over LTE-Uu.

The V2X configuration parameters can be pre-configured in the Mobile Equipment (ME); configured in the Universal Subscriber Identity Module (USIM); provided by the V2X control function to the ME using procedures; or any combination thereof. The UE may use the V2X configuration parameters in the following order of decreasing precedence: a) the V2X configuration parameters provided by the V2X control function to the ME using the V2X control function discovery procedure and the V2X authorization procedure; b) the V2X configuration parameters configured in the USIM; and c) the V2X configuration parameters pre-configured in the ME.

The configuration parameters for V2X provisioning may include a V2X control function address. The V2X control function address can be an fully qualified domain name (FQDN) or an IP address; and parameters of a Packet Data Network (PDN) connection for communication with V2X control function.

The configuration parameters for V2X communication over PC5 may include: a) an expiration time for the validity of the configuration parameters for V2X communication over PC5; b) a list of Public Land Mobile Networks (PLMNs) in which the UE is authorized to use V2X communication over PC5 when the UE is served by E-UTRAN for V2X communication; c) an indication of whether the UE is authorized to use V2X communication over PC5 when the UE is not served by E-UTRAN for V2X communication; d) per geographical area: 1) radio parameters for V2X communication over PC5 applicable when the UE is not served by E-UTRAN for V2X communication and is located in the geographical area, with an indication of whether these radio parameters are "operator managed" or "non-operator managed"; e) a list of the V2X services authorized for V2X communication over PC5. Each entry of the list contains: 1) a V2X service identifier; and 2) a destination Layer-2 ID; f) ProSe Per-Packet Priority (PPPP) to Packet Delay Budget (PDB) mapping rules between the PPPP and the PDB for V2X communication over PC5; g) optionally, a default destination Layer-2 ID; h) optionally, a configuration for the applicability of privacy for V2X communication over PC5, containing: 1) a T5000 timer indicating how often the UE shall change the source Layer-2 ID and source IP address (for IP data) self-assigned by the UE for V2X communication over PC5; and 2) a list of the V2X services which require privacy for V2X communication over PC5. Each entry in the list contains: A) a V2X service identifier; and B) optionally, one or more associated geographical areas; and i) optionally, V2X service identifier to V2X frequency mapping rules between the V2X service identifiers and the V2X frequencies with associated geographical areas for V2X communication over PC5.

The UE sends messages of the V2X authorization procedure to the V2X control function IP address discovered as discussed previously.

V2X Control Plane Based Provisioning

FIG. 1 illustrates an example of various entities, e.g., a UE 101, an AMF 103, and their operations in a vehicular communication system, in accordance with some embodiments. In detail, FIG. 1 shows an example procedure for provisioning V2X parameters V2X according to various embodiments herein. In this example, the Control Function can be collocated with a PCF (see e.g., FIG. 7 infra). The other entities shown by FIG. 1 are also shown and described with regard to FIGS. 5, 6, and 7 infra.

The V2X parameters provisioning procedure may operate as follows.

At 1, the UE 101 may send a Registration Request message to the AMF 103. The Registration Request message may indicate that the UE is capable of supporting: V2X communication over E-UTRA PC5 or NR PC5; or V2X communication over Uu (E-UTRA) or NG-Uu (NR). The indication of support capability may be included in a V2X policy container.

At 2, the AMF 103 retrieves UE subscription data from UDM.

At 3, the AMF 103 determines whether to provide V2X parameters to the UE, e.g. based on the information subscription data, local policy, etc.

At 4, 5, the AMF 103 requests V2XCF for the provision parameters by V2X Parameter Request message including the V2X Policy container, and V2XCF responses with the corresponding policy/parameters in the V2X Policy container by V2X Parameter Response message.

At 6, The AMF 103 sends the Registration Accept message to UE. The V2X policy/parameters may be included in the V2X Policy container in this message. NOTE: Steps 4 and 6 can be executed in parallel.

At 7, the AMF 103 may deliver the V2X policy/parameters in the V2X Policy container to UE via NAS message.

At 8, the UE 101 performs the V2X policy/parameters and sends the result to AMF.

At 9, if the AMF 103 received the UE Policy container and the V2X Control Function subscribed to be notified of the reception of the UE Policy container then the AMF 103 forwards the response of the UE 101 to the PCF using Namf_EventExposure including EventID "V2X Policy container received" and EventInformation including the UE V2X Policy container.

At 10, the V2X Control Function confirms the reception of the Namf_EventExposure to the AMF 103.

The configuration parameters for V2X provisioning may include a V2X control function address. The V2X control function address can be an fully qualified domain name (FQDN) or an IP address; and parameters of a Packet Data Network (PDN) connection for communication with V2X control function.

The various entities in FIG. 1 may be implemented in many ways. In some embodiments, an apparatus to be used in a UE, e.g., the UE 101, in a vehicular communication system may include processing circuitry and network circuitry coupled with the processing circuitry. The processing circuitry may determine a capability of the UE for supporting vehicle-to-everything (V2X) communication over a PC5 interface. In addition, the network circuitry may transmit a message to an AMF to indicate the capability of the UE for supporting V2X communication; and receive at least a V2X policy and V2X parameters for the UE from the AMF, wherein the V2X policy and V2X parameters for the UE are determined based on the capability of the UE for supporting V2X communication.

In some embodiments, the processing circuitry is further to: store the received V2X policy and the V2X parameters; and perform operations associated with the V2X policy and the V2X parameters. Moreover, the network circuitry is further to transmit results obtained from the operations performed by the UE to the AMF.

In embodiments, the PC5 interface is a Long Term Evolution (LTE) PC5 interface or a New Radio (NR) PC5 interface. The capability of the UE for supporting V2X communication is included in a registration request message or a non-access stratum (NAS) message. The V2X policy and the V2X parameters are received in a V2X Policy container via a downlink (DL) NAS transport message. Furthermore, the V2X policy and the V2X parameters for the UE are determined by a Policy Control Function (PCF) or a V2X Control Function (V2XCF).

In some embodiments, the UE 101 and the AMF 103 may be implemented by a programmable device.

In embodiments, one or more non-transitory, computer-readable media having instructions that, when executed, cause the UE 101 in a vehicular communication system to: determine a capability of the UE for supporting vehicle-to-everything (V2X) communication over a PC5 interface; generate a message to be transmitted to an access and mobility management function (AMF) to indicate the capability of the UE for supporting V2X communication; and receive at least a V2X policy and V2X parameters for the UE from the AMF, wherein the V2X policy and V2X parameters for the UE are determined based on the capability of the UE for supporting V2X communication.

In addition, the instructions of the one or more non-transitory, computer-readable media, when executed, further cause the UE 101 to: store the received V2X policy and the V2X parameters; perform operations associated with the V2X policy and the V2X parameters; transmit results obtained from the operations performed by the UE to the AMF; and receive a registration accept message from the AMF.

In embodiments, one or more non-transitory, computer-readable media having instructions that, when executed, cause the AMF 103 to: receive a message from a user equipment (UE) indicating a capability of the UE for supporting vehicle-to-everything (V2X) communication over a PC5 interface; determine whether to provide at least a V2X policy and V2X parameters to the UE based on the capability of the UE for supporting V2X communication, subscription data of the UE, or local policy; obtain the V2X policy and the V2X parameters, wherein the V2X policy and the V2X parameters are determined based on the capability of the UE for supporting V2X communication; and generate one or more messages to provide an indication of the V2X policy and the V2X parameters to the UE.

In addition, the instructions of the one or more non-transitory, computer-readable media, when executed, further cause the AMF 103 to: retrieve the subscription data of the UE from a Unified Data Management (UDM); transmit a registration accept message to the UE; request, by a parameter request message, the V2XCF or the PCF to provide the V2X policy and the V2X parameters, wherein the parameter request message includes the capability of the UE for supporting V2X communication; receive the V2X policy and the V2X parameters from the PCF or the V2XCF; receive results obtained from operations performed by the UE associated with the V2X policy and the V2X parameters; notify the PCF or the V2XCF the results received from the UE; and forward the received results from the UE to the PCF or the V2XCF by "Namf_EventExposure", wherein EventID includes "V2X Policy container received" and EventInformation includes a UE V2X Policy container.

V2X System Architecture

Figure 2:
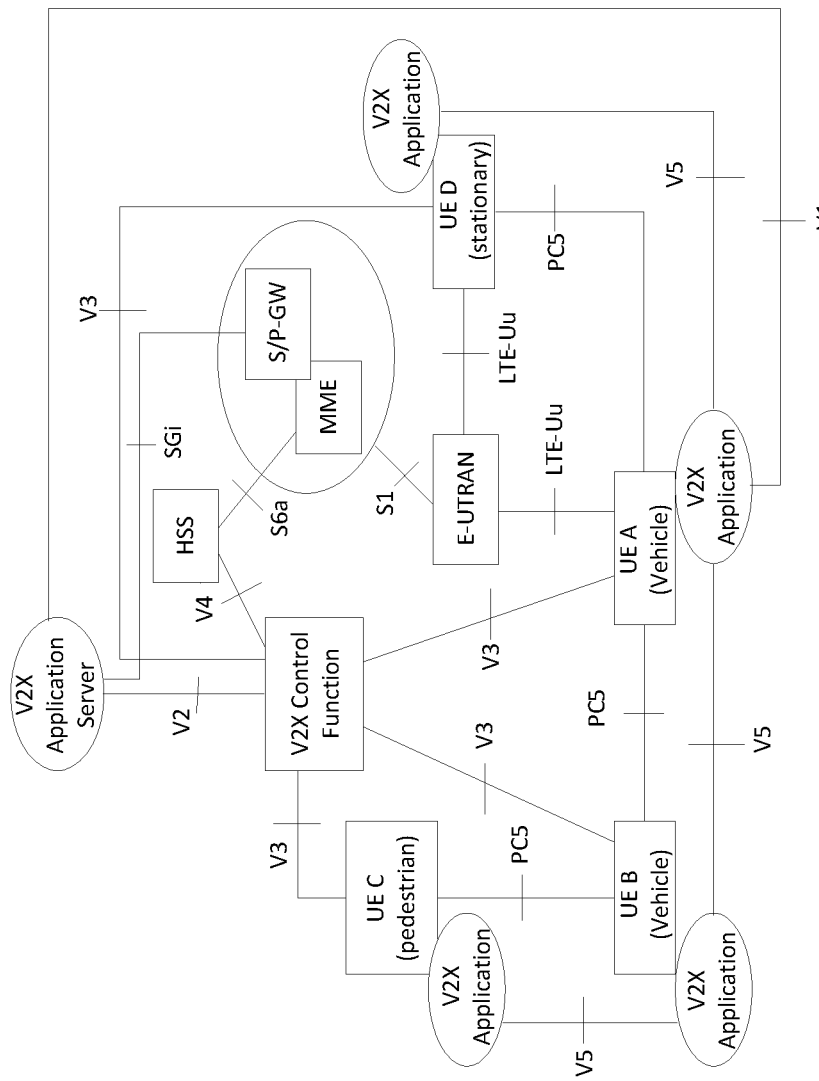
FIG. 2 illustrates another example of various entities and their operations in a vehicular communication system, in accordance with some embodiments.

FIG. 2 illustrates another example of various entities and their operations in a vehicular communication system, in accordance with some embodiments.

There are two modes of operation for V2X communication, namely over the PC5 and over LTE-Uu. LTE-Uu can be unicast and/or MBMS. These two operation modes may be used by a UE independently for transmission and reception, e.g. a UE can use MBMS for reception without using LTE-Uu for transmission. A UE may also receive V2X messages via LTE-Uu unicast downlink. For both operation modes, the following principles apply: (A) V2X Application Servers, which may be in different domains, can communicate with each other for the exchange of V2X messages. The interface between V2X Application Servers and the methods of the exchange of messages between V2X Application Servers is out of scope of 3GPP. (B) ProSe discovery feature is not required for V2X Services. (C) Subject to regional regulations, lawful interception requirements apply to V2X Services. (D) An RSU is not an architectural entity, but an implementation option. This is achieved by collocating a V2X application logic/server with some entities of the 3GPP system. Figure V2X-1 shows the high level view of the non-roaming architecture for PC5 and LTE-Uu based V2X communication.

The V2X Control Function is a logical function that is used for network related actions required for V2X. In this version of the specification it is assumed that there is only one logical V2X Control Function in each PLMN that supports V2X Services. The V2X Control Function is used to provision the UE with necessary parameters in order to use V2X communication. It is used to provision the UEs with PLMN specific parameters that allow the UE to use V2X in this specific PLMN. V2X Control Function is also used to provision the UE with parameters that are needed when the UE is "not served by E-UTRAN". The V2X Control Function may also be used to obtain V2X USDs for UEs to receive MBMS based V2X traffic, through V2 reference point from the V2X Application Server. The V2X Control Function may also obtain the parameters required for V2X communications over PC5 reference point, from the V2X Application Server via V2 reference point.

The V2X Control Function in HPLMN can be always reached if Home Routed configuration is applied for PDN connection (e.g., the PDN GW is located in the HPLMN), when such function is supported by the HPLMN. In case of Local Breakout (e.g., the PDN GW is located in the VPLMN), a V2X Control Function Pro14 can be deployed by the VPLMN to support UE to Home V2X Control Function communication, if inter-PLMN signaling is required. Whether a PDN connection is provided by Local Breakout or Home Routed is determined by the HSS configuration described in TS 23.401 [6]. The UE is not aware of this and, as such, it will not know which APN can be used for communication with the V2X Control Function, unless the specific APN information is configured in the UE indicating that this APN provides signaling connectivity between the UE and the Home V2X Control Function.

The V2X Control Function of HPLMN is discovered through interaction with the Domain Name Service function. The FQDN of a V2X Control Function in the Home PLMN may either be pre-configured in the UE, provisioned by the network or self-constructed by the UE, e.g., derived from the PLMN ID of the HPLMN. The IP address of a V2X Control Function in the Home PLMN may also be provisioned to the UE.

Figure 5:
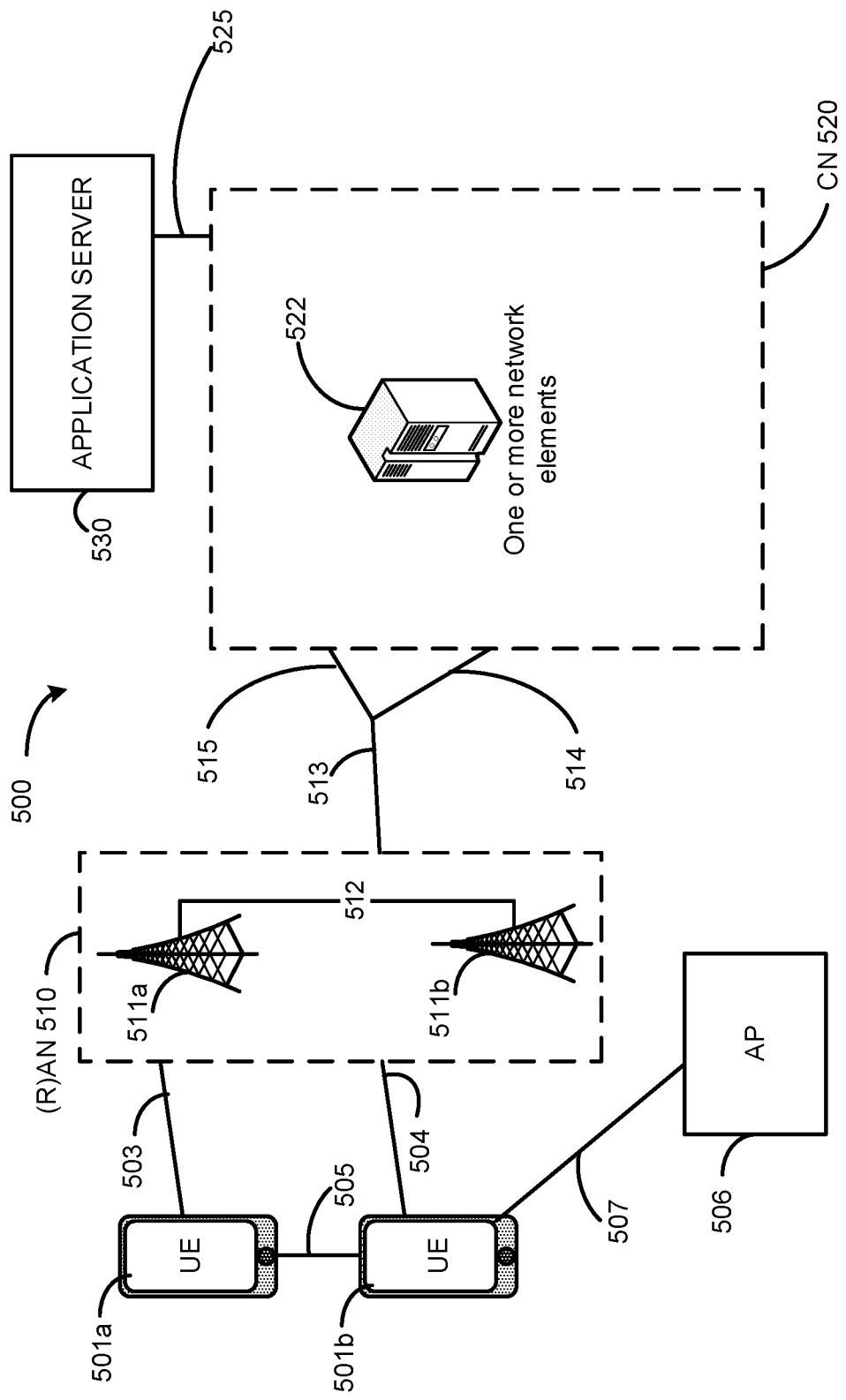
FIG. 5 illustrates an architecture of a system of a network, in accordance with various embodiments.
Figure 6:
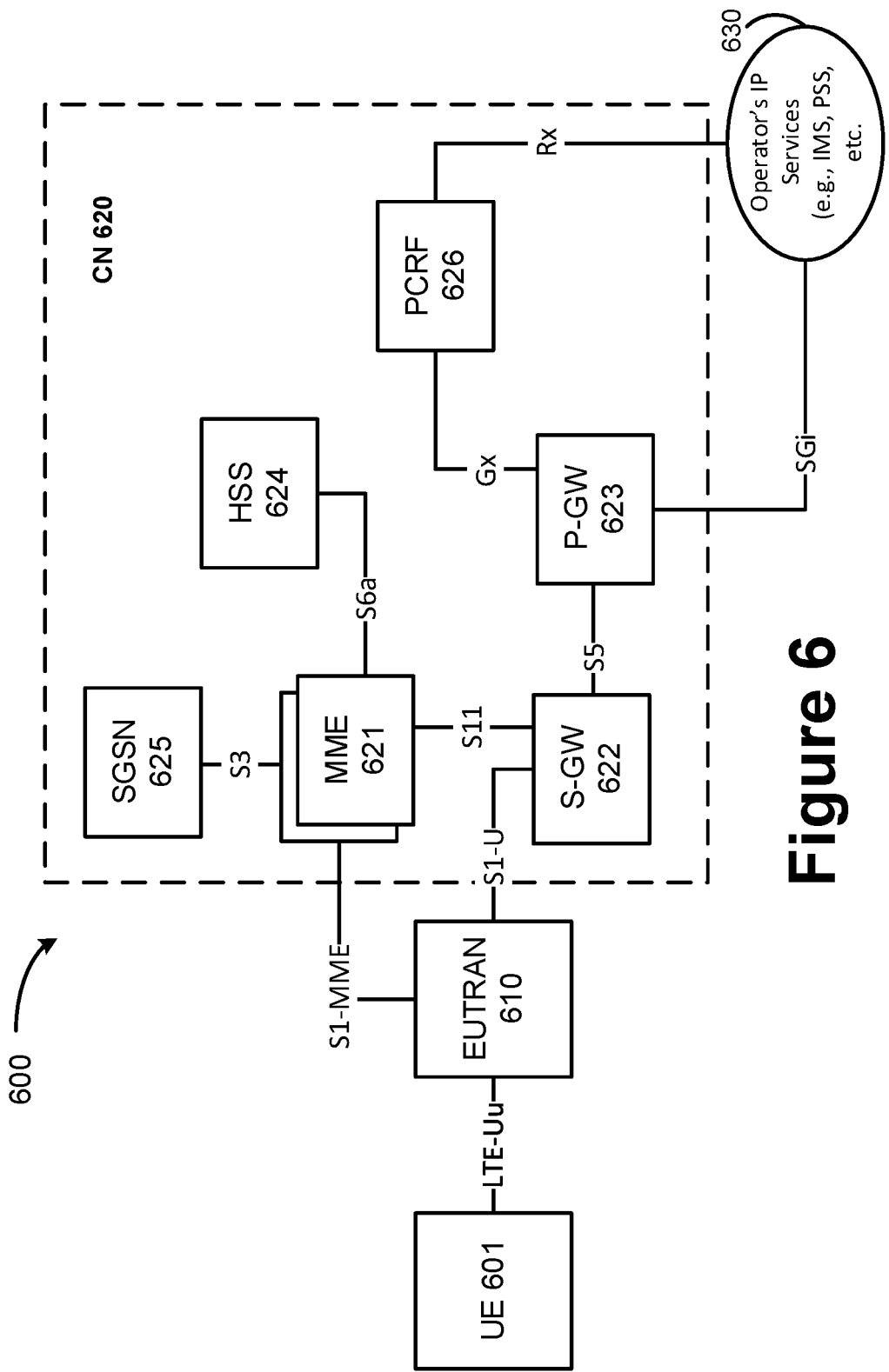
FIG. 6 illustrates an example architecture of a system including a core network, in accordance with various embodiments.

Various entities shown by FIG. 2 are shown and described with regard to FIGS. 5, 6(*a*), and 6(*b*) infra. In addition to the functions discussed with regard to FIGS. 5-14, the UE may support one or more additional functions, some examples of which are provided below.

In some embodiments, the UE may support an exchange of V2X control information with the V2X Control Function over the V3 reference point.

In some embodiments, the UE may support procedures for V2X communication over a PC5 reference point or an LTE-Uu reference point.

In addition to the functions discussed infra with regard to FIGS. 5-14, in case of V2X the MME obtains subscription information related to V2X as part of the subscription data (e.g., from the HSS), and provides indication(s) to the E-UTRAN about the UE authorization status on V2X use.

In case of V2X the Broadcast Multicast Service Center (BM-SC) receives L.MBMS information from V2X Application Server and sends L.MBMS information to the Multimedia Broadcast/Multicast Service (MBMS)-Gateway (GW). If receiving L.MBMS information from the BM-SC, the MBMS-GW skips the allocation procedure for IP multicast distribution, e.g., allocating an IP multicast address.

The system of FIG. 2 includes the following reference points:

V1: The reference point between the V2X application in the UE and in the V2X Application Server. This reference point is out of scope of this specification.

V2: The reference point between the V2X Application Server and the V2X Control Function in the operator's network. The V2X Application Server may connect to V2X Control Functions belonging to multiple PLMNs.

V3: The reference point between the UE and the V2X Control Function in UE's home PLMN. It is based on the service authorization and provisioning part of the PC3 reference point. It is applicable to both PC5 and LTE-Uu based V2X communication and optionally MBMS and LTE-Uu based V2X communication.

V4: The reference point between the HSS and the V2X Control Function in the operator's network.

V5: The reference point between the V2X applications in the UEs. This reference point is not specified in this release of the specification.

V6: The reference point between the V2X Control Function in the HPLMN and the V2X Control Function in the VPLMN.

PC5: The reference point between the UEs used for user plane for ProSe Direct Communication for V2X Service.

S6a: In addition to the relevant functions defined for S6a, in case of V2X Service S6a is used to download V2X Service related subscription information to MME during E-UTRAN attach procedure or to inform MME subscription information in the HSS has changed.

S1-MME: In addition to the relevant functions defined for S1-MME, in case of V2X Service it is also used to convey the V2X Service authorization from MME to eNodeB.

xMB: The reference point between the V2X Application Server (e.g. Content Provider) and the BM-SC.

MB2: The reference point between the V2X Application Server and the BM-SC.

SGmb/SGi-mb/1V11/1V13: The SGmb/SGi-mb/M1/M3 reference points are internal to the MBMS system.

LTE-Uu: The reference point between the UE and the E-UTRAN.

Figure 3:
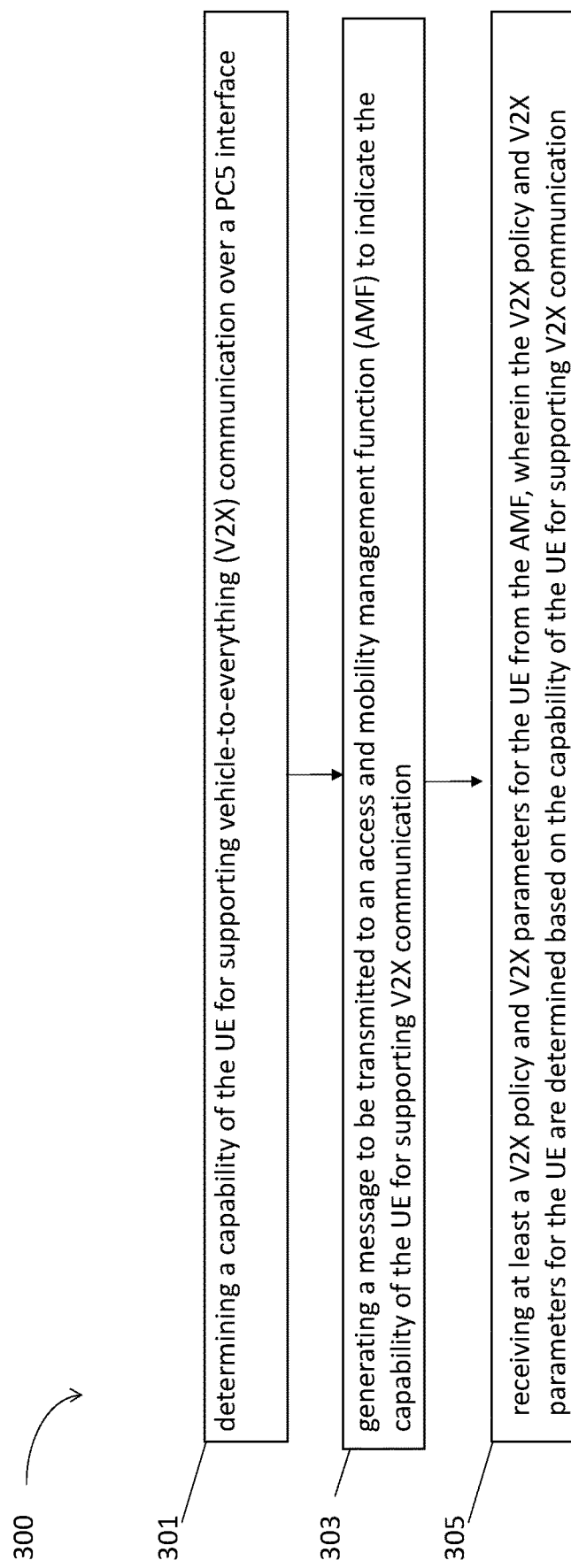
FIGS. 3-4 illustrate operation flows/processes performed by entities in a vehicular communication system, in accordance with some embodiments.
Figure 4:
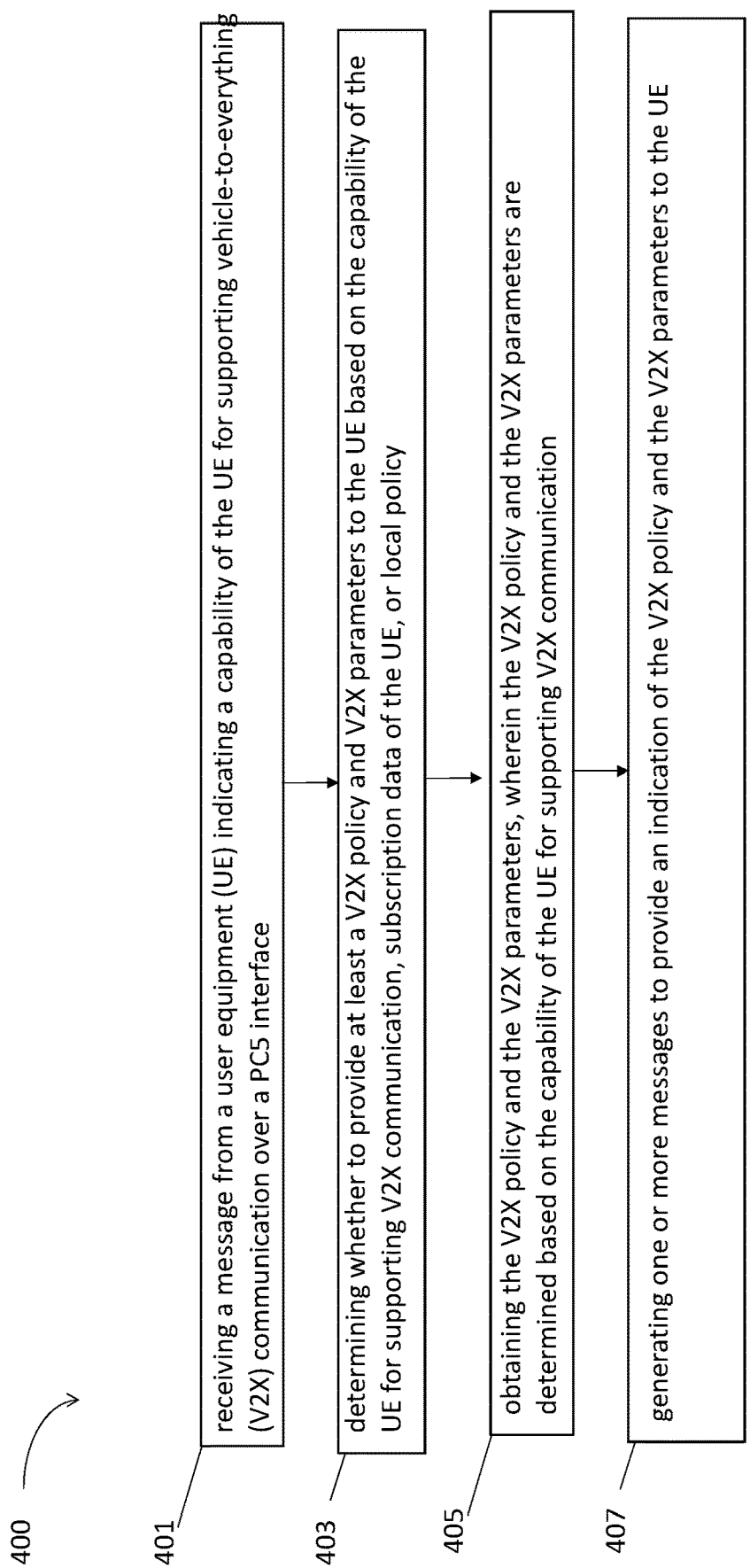

FIGS. 3-4 illustrate operation flows/processes performed by entities in a vehicular communication system, in accordance with some embodiments. In particular, FIG. 3 illustrates an operation flow/algorithmic structure 300 that may be implemented by a UE, e.g., the UE 101, or components thereof, as described herein with respect to any one of FIG. 1, or FIGS. 5-15. FIG. 4 illustrates operation flows/algorithmic structures 400 for an AMF, e.g., the AMF 103, or components thereof, as described herein with respect to any one of FIG. 1, or FIGS. 5-15.

The operation flow/algorithmic structure 300 may include, at 301, determining a capability of the UE for supporting vehicle-to-everything (V2X) communication over a PC5 interface; at 303, generating a message to be transmitted to an access and mobility management function (AMF) to indicate the capability of the UE for supporting V2X communication; at 305, receiving at least a V2X policy and V2X parameters for the UE from the AMF, wherein the V2X policy and V2X parameters for the UE are determined based on the capability of the UE for supporting V2X communication. The operations of the operation flow/algorithmic structure 300 may be carried out by a processing circuitry of a UE, e.g., the UE 101, application circuitry 805/905, baseband circuitry 810/910, or radio front end modules (RFEM) 815/915, as shown in FIGS. 1, and 5-15.

The operation flow/algorithmic structure 400 may include, at 401, receiving a message from a user equipment (UE) indicating a capability of the UE for supporting vehicle-to-everything (V2X) communication over a PC5 interface; at 403, determining whether to provide at least a V2X policy and V2X parameters to the UE based on the capability of the UE for supporting V2X communication, subscription data of the UE, or local policy; at 405, obtaining the V2X policy and the V2X parameters, wherein the V2X policy and the V2X parameters are determined based on the capability of the UE for supporting V2X communication; and at 407, generating one or more messages to provide an indication of the V2X policy and the V2X parameters to the UE. The operations of the operation flow/algorithmic structure 400 may be carried out by a processing circuitry of an AMF, e.g., application circuitry 805/905, or baseband circuitry 810/910; radio front end modules (RFEM) 815/915, network controller circuitry 835, or one or more antennas 1011, of the AMF 103, the AMF 721, as shown in FIGS. 1, and 5-15.

FIG. 5 illustrates an architecture of a system 500 of a network in accordance with some embodiments. The following description is provided for an example system 500 that operates in conjunction with the as Long Term Evolution (LTE) system standards and the Fifth Generation (5G) or New Radio (NR) system standards as provided by 3rd Generation Partnership Project (3GPP) technical specifications (TS). However, the example embodiments are not limited in this regard and the described embodiments may apply to other networks that benefit from the principles described herein, such as future 3GPP systems (e.g., Si10h Generation (6G)) systems, Institute of Electrical and Electronics Engineers (IEEE) 802.16 protocols (e.g., Wireless metropolitan area networks (MAN), Worldwide Interoperability for Microwave Access (WiMAX), etc.), or the like.

As shown by FIG. 5, the system 500 may include user equipment (UE) 501*a* and UE 501*b* (collectively referred to as "UEs 501" or "UE 501"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 501 can comprise an IoT UE, which may comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with a access network (AN) or radio access network (RAN) 510. In embodiments, the RAN 510 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Spécial Mobile) EDGE (GSM Evolution) Radio Access Network). As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 501 may directly exchange communication data via a ProSe interface 505. The ProSe interface 505 may alternatively be referred to as a sidelink (SL) interface 505 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 501b is shown to be configured to access an access point (AP) 506 (also referred to as also referred to as "WLAN node 506", "WLAN 506", "WLAN Termination 506" or "WT 506" or the like) via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below). In various embodiments, the UE 501b, RAN 510, and AP 506 may be configured to utilize LTE-WLAN aggregation (LWA) operation and/or WLAN LTE/WLAN Radio Level Integration with IPsec Tunnel (LWIP) operation. The LWA operation may involve the UE 501b in RRC CONNECTED being configured by a RAN node 511 to utilize radio resources of LTE and WLAN. LWIP operation may involve the UE 501b using WLAN radio resources (e.g., connection 507) via Internet Protocol Security (IPsec) protocol tunneling to authenticate and encrypt packets (e.g., internet protocol (IP) packets) sent over the connection 507. IPsec tunneling may include encapsulating entirety of original IP packets and adding a new packet header thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell).

The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." An RSU is a computing device coupled with radiofrequency circuitry located on a roadside that provides connectivity support to passing vehicle UEs 501. The RSU may also include internal data storage circuitry to store intersection map geometry, traffic statistics, media, as well as applications/software to sense and control on-going vehicular and pedestrian traffic. The RSU may operate on the 5.9 GHz Direct Short Range Communications (DSRC) band to provide very low latency communications required for high speed events, such as crash avoidance, traffic warnings, and the like. In addition, the RSU may operate as a WiFi hotspot (2.4 GHz band) and/or provide connectivity to one or more cellular networks to provide uplink and downlink communications. The computing device and some or all of the radiofrequency circuitry of the RSU may be packaged in a weatherproof enclosure suitable for outdoor installation, and may include a network interface controller to provide a wired (e.g., Ethernet) connection to a traffic signal controller requiring and/or a backhaul network As used herein, the term "NG RAN node" or the like may refer to a RAN node 511 that operates in an NR or 5G system 500 (for example a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 511 may be implemented as one or more software entities running on server computers as part of a virtual network, which may be referred to as a cloud radio access network (CRAN). In other embodiments, the RAN nodes 511 may represent individual gNB-distributed units (DUs) that are connected to a gNB-centralized unit (CU) via an F1 interface (not shown by FIG. 5).

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using Orthogonal Frequency-Division Multiplexing (OFDM) communication signals with each other or with any of the RAN nodes 511 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501 and the RAN nodes 511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501 and the RAN nodes 511 may operate using Licensed Assisted Access (LAA), enhanced LAA (eLAA), and/or further eLAA (feLAA) mechanisms. In these implementations, the UEs 501 and the RAN nodes 511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501, RAN nodes 511, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UEs 501, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y extended CCA (ECCA) slots, where X and Y are minimum and maximum values for the CWSs for LAA. In one example, the minimum CWS for an LAA transmission may be 9 microseconds (µs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers. In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UEs 501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The physical downlink shared channel (PDSCH) may carry user data and higher-layer signaling to the UEs 501. The physical downlink control channel (PDCCH) may carry information about the transport format and resource allocations related to the PDSCH channel, among other things. It may also inform the UEs 501 about the transport format, resource allocation, and H-ARQ (Hybrid Automatic Repeat Request) information related to the uplink shared channel. Typically, downlink scheduling (assigning control and shared channel resource blocks to the UE 501*b* within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 511 may be configured to communicate with one another via interface 512. In embodiments where the system 500 is an LTE system, the interface 512 may be an X2 interface 512. The X2 interface may be defined between two or more RAN nodes 511 (e.g., two or more eNBs and the like) that connect to EPC, and/or between two eNBs connecting to EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to CN 520, between a RAN node 511 (e.g., a gNB) connecting to CN 520 and an eNB, and/or between two eNBs connecting to CN 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, Core Network (CN) 520. The CN 520 may comprise a plurality of network elements 522, which are configured to offer various data and telecommunications services to customers/subscribers (e.g., users of UEs 501) who are connected to the CN 520 via the RAN 510. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS Packet Services (PS) domain, LTE PS data services, etc.). The application server 530 can also be configured to support one or more communication services (e.g., Voice-over-Internet Protocol (VoIP) sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a user plane function (UPF), and the S1 control plane (NG-C) interface 515, which is a signaling interface between the RAN nodes 511 and Access and Mobility Functions (AMFs). Embodiments where the CN 520 is a 5GC 520 are discussed in more detail with regard to FIG. 7.

In embodiments, the CN 520 may be a 5G CN (referred to as "5GC 520" or the like), while in other embodiments, the CN 520 may be an Evolved Packet Core (EPC)). Where CN 520 is an EPC (referred to as "EPC 520" or the like), the RAN 510 may be connected with the CN 520 via an S1 interface 513. In embodiments, the S1 interface 53 may be split into two parts, an S1 user plane (S1-U) interface 514, which carries traffic data between the RAN nodes 511 and the serving gateway (S-GW), and the S1-mobility management entity (MME) interface 515, which is a signaling interface between the RAN nodes 511 and MMES. An example architecture wherein the CN 520 is an EPC 520 is shown by FIG. 6.

FIG. 6 illustrates an example architecture of a system 600 including a first CN 620 is shown, in accordance with various embodiments. In this example, system 600 may implement the LTE standard wherein the CN 620 is an EPC 620 that corresponds with CN 520 of FIG. 5. Additionally, the UE 601 may be the same or similar as the UEs 501 of FIG. 5, and the EUTRAN 610 may be a RAN that is the same or similar to the RAN 510 of FIG. 5, and which may include RAN nodes 511 discussed previously. The CN 620 may comprise MMEs 621, an S-GW 622, a Packet Data Network (PDN) Gateway (P-GW) 623, a home subscriber server (HSS) 624, and a Serving General Packet Radio Service (GPRS) Support Nodes (SGSN) 625.

The MMEs 621 may be similar in function to the control plane of legacy SGSN, and may implement mobility management (MM) functions to keep track of the current location of a UE 601. The MMEs 621 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 601, provide user identity confidentiality, and/or other like services to users/subscribers. Each UE 601 and the MME 621 may include an MM or EMM sublayer, and an MM context may be established in the UE 601 and the MME 621 when an attach procedure is successfully completed. The MM context may be a data structure or database object that stores MM-related information of the UE 601. The MMEs 621 may be coupled with the HSS 624 via an S6a reference point, coupled with the SGSN 625 via an S3 reference point, and coupled with the S-GW 622 via an S11 reference point.

The SGSN 625 may be a node that serves the UE 601 by tracking the location of an individual UE 601 and performing security functions. In addition, the SGSN 625 may perform Inter-EPC node signaling for mobility between 2G/3G and E-UTRAN 3GPP access networks; PDN and S-GW selection as specified by the MMEs 621; handling of UE 601 time zone functions as specified by the MMEs 621; and MME selection for handovers to E-UTRAN 3GPP access network. The S3 reference point between the MMEs 621 and the SGSN 625 may enable user and bearer information exchange for inter-3GPP access network mobility in idle and/or active states.

The HSS 624 may comprise a database for network users, including subscription-related information to support the network entities' handling of communication sessions. The EPC 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc. An S6a reference point between the HHS 624 and the MMEs 621 may enable transfer of subscription and authentication data for authenticating/authorizing user access to the EPC 620 between HHS 624 and the MMEs 621.

The S-GW 622 may terminate the S1 interface 513 ("S1-U" in FIG. 6) towards the RAN 610, and routes data packets between the RAN 610 and the EPC 620. In addition, the S-GW 622 may be a local mobility anchor point for inter-RAN node handovers and also may provide an anchor for inter-3GPP mobility. Other responsibilities may include lawful intercept, charging, and some policy enforcement. The S11 reference point between the S-GW 622 and the MMEs 621 may provide a control plane between the MMEs 621 and the S-GW 622. The S-GW 622 may be coupled with the P-GW 623 via an S5 reference point.

The P-GW 623 may terminate an SGi interface toward a Packet Data Network (PDN) 630. The P-GW 623 may route data packets between the EPC 620 and external networks such as a network including the application server 530 (alternatively referred to as application function (AF)) via an Internet Protocol (IP) interface 525 (see e.g., FIG. 5). In embodiments, the P-GW 623 may be communicatively coupled to an application server (application server 530 of FIG. 5 or PDN 630 in FIG. 6) via an IP communications interface 525 (see e.g., FIG. 5). The S5 reference point between the P-GW 623 and the S-GW 622 may provide user plane tunneling and tunnel management between the P-GW 623 and the S-GW 622. The S5 reference point may also be used for S-GW 622 relocation due to UE 601 mobility and if the S-GW 622 needs to connect to a non-collocated P-GW 623 for the required PDN connectivity. The P-GW 623 may further include a node for policy enforcement and charging data collection (e.g., Policy and Charging Enforcement Function (PCEF) (not shown). Additionally, the SGi reference point between the P-GW 623 and the packet data network (PDN) 630 may be an operator external public, a private PDN, or an intra operator packet data network, for example, for provision of IMS services. The P-GW 623 may be coupled with a PCRF 626 via a Gx reference point.

Policy and Charging Enforcement Function (PCRF) 626 is the policy and charging control element of the EPC 620. In a non-roaming scenario, there may be a single PCRF 626 in the Home Public Land Mobile Network (HPLMN) associated with an UE's 601 Internet Protocol Connectivity Access Network (IP-CAN) session. In a roaming scenario with local breakout of traffic, there may be two PCRFs associated with an UE's 601 IP-CAN session, a Home PCRF (H-PCRF) within a HPLMN and a Visited PCRF (V-PCRF) within a Visited Public Land Mobile Network (VPLMN). The PCRF may be communicatively coupled to the application server 630 via the P-GW 623. The application server 630 may signal the PCRF to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630. The Gx reference point between the PCRF 626 and the P-GW 623 may allow for the transfer of (QoS) policy and charging rules from the PCRF 626 to Policy and Charging Enforcement Function (PCEF) in the P-GW 623. An Rx reference point may reside between the PDN 630 (or "AF 630") and the PCRF 626.

Figure 7:
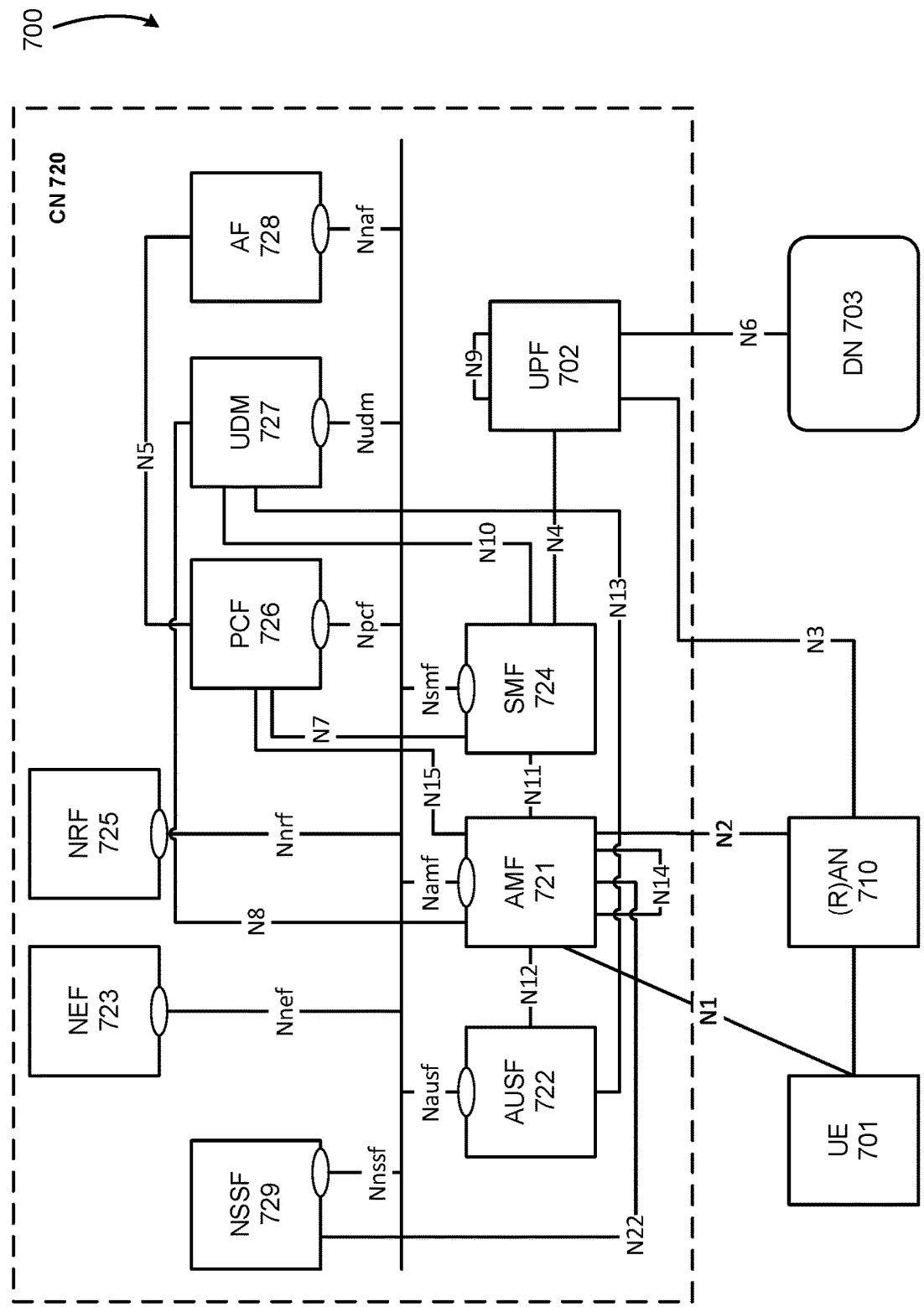
FIG. 7 illustrates an architecture of a system including a core network, in accordance with various embodiments.

FIG. 7 illustrates an architecture of a system 700 including a second CN 720 is shown in accordance with various embodiments. The system 700 is shown to include a UE 701, which may be the same or similar to the UEs 501 and UE 601 discussed previously; a (R)AN 710, which may be the same or similar to the RAN 510 and RAN 610 discussed previously, and which may include RAN nodes 511 discussed previously; and a Data network (DN) 703, which may be, for example, operator services, Internet access or 3rd party services; and a 5G Core Network (5GC or CN) 720.

The 5GC 720 may include an Authentication Server Function (AUSF) 222; an Access and Mobility Management Function (AMF) 721; a Session Management Function (SMF) 724; a Network Exposure Function (NEF) 723; a Policy Control function (PCF) 726; a Network Function (NF) Repository Function (NRF) 725; a Unified Data Management (UDM) 727; an Application Function (AF) 728; a User Plane Function (UPF) 702; and a Network Slice Selection Function (NSSF) 729.

The UPF 702 may act as an anchor point for intra-RAT and inter-RAT mobility, an external PDU session point of interconnect to DN 703, and a branching point to support multi-homed PDU session. The UPF 702 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 702 may include an uplink classifier to support routing traffic flows to a data network. The DN 703 may represent various network operator services, Internet access, or third party services. DN 703 may include, or be similar to application server 530 discussed previously. The UPF 702 may interact with the SMF 724 via an N4 reference point between the SMF 724 and the UPF 702.

The AUSF 722 may store data for authentication of UE 701 and handle authentication related functionality. The AUSF 722 may facilitate a common authentication framework for various access types. The AUSF 722 may communicate with the AMF 721 via an N12 reference point between the AMF 721 and the AUSF 722; and may communicate with the UDM 727 via an N13 reference point between the UDM 727 and the AUSF 722. Additionally, the AUSF 722 may exhibit an Nausf service-based interface.

The AMF 721 may be responsible for registration management (e.g., for registering UE 701, etc.), connection management, reachability management, mobility management, and lawful interception of AMF-related events, and access authentication and authorization. The AMF 721 may be a termination point for the an N11 reference point between the AMF 721 and the SMF 724. The AMF 721 may provide transport for Session Management (SM) messages between the UE 701 and the SMF 724, and act as a transparent pro14 for routing SM messages. AMF 721 may also provide transport for short message service (SMS) messages between UE 701 and an SMS function (SMSF) (not shown by FIG. 7). AMF 721 may act as Security Anchor Function (SEA), which may include interaction with the AUSF 722 and the UE 701, receipt of an intermediate key that was established as a result of the UE 701 authentication process. Where USIM based authentication is used, the AMF 721 may retrieve the security material from the AUSF 722. AMF 721 may also include a Security Context Management (SCM) function, which receives a key from the SEA that it uses to derive access-network specific keys. Furthermore, AMF 721 may be a termination point of RAN CP interface, which may include or be an N2 reference point between the (R)AN 711 and the AMF 721; and the AMF 721 may be a termination point of NAS (N1) signalling, and perform NAS ciphering and integrity protection.

AMF 721 may also support NAS signalling with a UE 701 over an N3 interworking-function (IWF) interface. The N3IWF may be used to provide access to untrusted entities. N3IWF may be a termination point for the N2 interface between the (R)AN 710 and the AMF 721 for the control plane, and may be a termination point for the N3 reference point between the (R)AN 710 and the UPF 702 for the user plane. As such, the AMF 721 may handle N2 signalling from the SMF 724 and the AMF 721 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 701 and AMF 721 via an N1 reference point between the UE 701 and the AMF 721, and relay uplink and downlink user-plane packets between the UE 701 and UPF 702. The N3IWF also provides mechanisms for IPsec tunnel establishment with the UE 701. The AMF 721 may exhibit an Namf service-based interface, and may be a termination point for an N14 reference point between two AMFs 721 and an N17 reference point between the AMF 721 and a 5G-Equipment Identity Register (5G-EIR) (not shown by FIG. 7).

The UE 701 may need to register with the AMF 721 in order to receive network services. Registration Management (RM) is used to register or deregister the UE 701 with the network (e.g., AMF 721), and establish a UE context in the network (e.g., AMF 721). The UE 701 may operate in an RM-REGISTERED state or an RM-DEREGISTERED state. In the RM-DEREGISTERED state, the UE 701 is not registered with the network, and the UE context in AMF 721 holds no valid location or routing information for the UE 701 so the UE 701 is not reachable by the AMF 721. In the RM-REGISTERED state, the UE 701 is registered with the network, and the UE context in AMF 721 may hold a valid location or routing information for the UE 701 so the UE 701 is reachable by the AMF 721. In the RM-REGISTERED state, the UE 701 may perform mobility Registration Update procedures, perform periodic Registration Update procedure triggered by expiration of the periodic update timer (e.g., to notify the network that the UE 701 is still active), and perform a Registration Update procedure to update UE capability information or to re-negotiate protocol parameters with the network, among others.

The AMF 721 may store one or more RM contexts for the UE 701, where each RM context is associated with a specific access to the network. The RM context may be a data structure, database object, etc. that indicates or stores, inter alia, a registration state per access type and the periodic update timer. The AMF 721 may also store a 5GC MM context that may be the same or similar to the (E)MM context discussed previously. In various embodiments, the AMF 721 may store a CE mode B Restriction parameter of the UE 701 in an associated MM context or RM context. The AMF 721 may also derive the value, when needed, from the UE's usage setting parameter already stored in the UE context (and/or MM/RM Context).

Connection Management (CM) may be used to establish and release a signaling connection between the UE 701 and the AMF 721 over the N1 interface. The signaling connection is used to enable NAS signaling exchange between the UE 701 and the CN 720, and comprises both the AN signaling connection between the UE and the Access Network (AN) (e.g., RRC connection or UE-N3IWF connection for Non-3GPP access) and the N2 connection for the UE 701 between the AN (e.g., RAN 710) and the AMF 721. The UE 701 may operate in one of two CM states, CM-IDLE mode or CM-CONNECTED mode. When the UE 701 is operating in the CM-IDLE state/mode, the UE 701 may have no NAS signaling connection established with the AMF 721 over the N1 interface, and there may be (R)AN 710 signaling connection (e.g., N2 and/or N3 connections) for the UE 701. When the UE 701 is operating in the CM-CONNECTED state/mode, the UE 701 may have an established NAS signaling connection with the AMF 721 over the N1 interface, and there may be a (R)AN 710 signaling connection (e.g., N2 and/or N3 connections) for the UE 701. Establishment of an N2 connection between the (R)AN 710 and the AMF 721 may cause the UE 701 to transition from CM-IDLE mode to CM-CONNECTED mode, and the UE 701 may transition from the CM-CONNECTED mode to the CM-IDLE mode when N2 signaling between the (R)AN 710 and the AMF 721 is released.

The SMF 724 may be responsible for Session Management (SM) (e.g., session establishment, modify and release, including tunnel maintain between UPF and AN node); UE IP address allocation & management (including optional Authorization); selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. SM may refer to management of a PDU session, and a PDU session or "session" may refer to a PDU Connectivity Service that provides or enables the exchange of PDUs between a UE 701 and a data network (DN) 703 identified by a Data Network Name (DNN). PDU Sessions may be established upon UE 701 request, modified upon UE 701 and 5GC 720 request, and released upon UE 701 and 5GC 720 request using NAS SM signaling exchanged over the N1 reference point between the UE 701 and the SMF 724. Upon request from an Application Server, the 5GC 720 may trigger a specific application in the UE 701. In response to receipt of the trigger message, the UE 701 may pass the trigger message (or relevant parts/information of the trigger message) to one or more identified applications in the UE 701. The identified application(s) in the UE 701 may establish a PDU Session to a specific DNN. The SMF 724 may check whether the UE 701 requests are compliant with user subscription information associated with the UE 701. In this regard, the SMF 724 may retrieve and/or request to receive update notifications on SMF 724 level subscription data from the UDM 727.

The SMF 724 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 724 may be included in the system 700, which may be between another SMF 724 in a visited network and the SMF 724 in the home network in roaming scenarios. Additionally, the SMF 724 may exhibit the Nsmf service-based interface.

The NEF 723 may provide means for securely exposing the services and capabilities provided by 3GPP network functions for third party, internal exposure/re-exposure, Application Functions (e.g., AF 728), edge computing or fog computing systems, etc. In such embodiments, the NEF 723 may authenticate, authorize, and/or throttle the AFs. NEF 723 may also translate information exchanged with the AF 728 and information exchanged with internal network functions. For example, the NEF 723 may translate between an AF-Service-Identifier and an internal 5GC information. NEF 723 may also receive information from other network functions (NFs) based on exposed capabilities of other network functions. This information may be stored at the NEF 723 as structured data, or at a data storage NF using a standardized interfaces. The stored information can then be re-exposed by the NEF 723 to other NFs and AFs, and/or used for other purposes such as analytics. Additionally, the NEF 723 may exhibit an Nnef service-based interface.

The NRF 725 may support service discovery functions, receive NF Discovery Requests from NF instances, and provide the information of the discovered NF instances to the NF instances. NRF 725 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 725 may exhibit the Nnrf service-based interface.

The PCF 726 may provide policy rules to control plane function(s) to enforce them, and may also support unified policy framework to govern network behaviour. The PCF 726 may also implement a front end (FE) to access subscription information relevant for policy decisions in a UDR of the UDM 727. The PCF 726 may communicate with the AMF 721 via an N15 reference point between the PCF 726 and the AMF 721, which may include a PCF 726 in a visited network and the AMF 721 in case of roaming scenarios. The PCF 726 may communicate with the AF 728 via an N5 reference point between the PCF 726 and the AF 728; and with the SMF 724 via an N7 reference point between the PCF 726 and the SMF 724. The system 700 and/or CN 720 may also include an N24 reference point between the PCF 726 (in the home network) and a PCF 726 in a visited network. Additionally, the PCF 726 may exhibit an Npcf service-based interface.

The UDM 727 may handle subscription-related information to support the network entities' handling of communication sessions, and may store subscription data of UE 701. For example, subscription data may be communicated between the UDM 727 and the AMF 721 via an N8 reference point between the UDM 727 and the AMF 721 (not shown by FIG. 7). The UDM 727 may include two parts, an application FE and a User Data Repository (UDR) (the FE and UDR are not shown by FIG. 7). The UDR may store subscription data and policy data for the UDM 727 and the PCF 726, and/or structured data for exposure and application data (including Packet Flow Descriptions (PFDs) for application detection, application request information for multiple UEs 201) for the NEF 723. The Nudr service-based interface may be exhibited by the UDR to allow the UDM 727, PCF 726, and NEF 723 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 724 via an N10 reference point between the UDM 727 and the SMF 724. UDM 727 may also support SMS management, wherein an SMS-FE implements the similar application logic as discussed previously. Additionally, the UDM 727 may exhibit the Nudm service-based interface.

The AF 728 may provide application influence on traffic routing, access to the Network Capability Exposure (NCE), and interact with the policy framework for policy control. The NCE may be a mechanism that allows the 5GC 720 and AF 728 to provide information to each other via NEF 723, which may be used for edge computing implementations. In such implementations, the network operator and third party services may be hosted close to the UE 701 access point of attachment to achieve an efficient service delivery through the reduced end-to-end latency and load on the transport network. For edge computing implementations, the 5GC may select a UPF 702 close to the UE 701 and execute traffic steering from the UPF 702 to DN 703 via the N6 interface. This may be based on the UE subscription data, UE location, and information provided by the AF 728. In this way, the AF 728 may influence UPF (re)selection and traffic routing. Based on operator deployment, when AF 728 is considered to be a trusted entity, the network operator may permit AF 728 to interact directly with relevant NFs. Additionally, the AF 728 may exhibit an Naf service-based interface.

The NSSF 729 may select a set of network slice instances serving the UE 701. The NSSF 729 may also determine allowed Network Slice Selection Assistance Information (NSSAI) and the mapping to the Subscribed Single-NSSAIs (S-NSSAIs), if needed. The NSSF 729 may also determine the AMF set to be used to serve the UE 701, or a list of candidate AMF(s) 721 based on a suitable configuration and possibly by querying the NRF 725. The selection of a set of network slice instances for the UE 701 may be triggered by the AMF 721 with which the UE 701 is registered by interacting with the NSSF 729, which may lead to a change of AMF 721. The NSSF 729 may interact with the AMF 721 via an N22 reference point between AMF 721 and NSSF 729; and may communicate with another NSSF 729 in a visited network via an N31 reference point (not shown by FIG. 7). Additionally, the NSSF 729 may exhibit an Nnssf service-based interface.

As discussed previously, the CN 720 may include an SMSF, which may be responsible for SMS subscription checking and verification, and relaying SM messages to/from the UE 701 to/from other entities, such as an SMS-GMSC/IWMSC/SMS-router. The SMS may also interact with AMF 721 and UDM 727 for notification procedure that the UE 701 is available for SMS transfer (e.g., set a UE not reachable flag, and notifying UDM 727 when UE 701 is available for SMS).

The CN 720 may also include other elements that are not shown by FIG. 7, such as a Data Storage system/architecture, a 5G-Equipment Identity Register (5G-EIR), a Security Edge Protection Pro14 (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 7). Individual NFs may share a UDSF for storing their respective unstructured data or individual NFs may each have their own UDSF located at or near the individual NFs. Additionally, the UDSF may exhibit an Nudsf service-based interface (not shown by FIG. 7). The 5G-EIR may be an NF that checks the status of Permanent Equipment Identifiers (PEI) for determining whether particular equipment/entities are blacklisted from the network; and the SEPP may be a non-transparent pro14 that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 7 for clarity. In one example, the CN 720 may include an Nx interface, which is an inter-CN interface between the MME (e.g., MME 621) and the AMF 721 in order to enable interworking between CN 720 and CN 620. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

Figure 8:
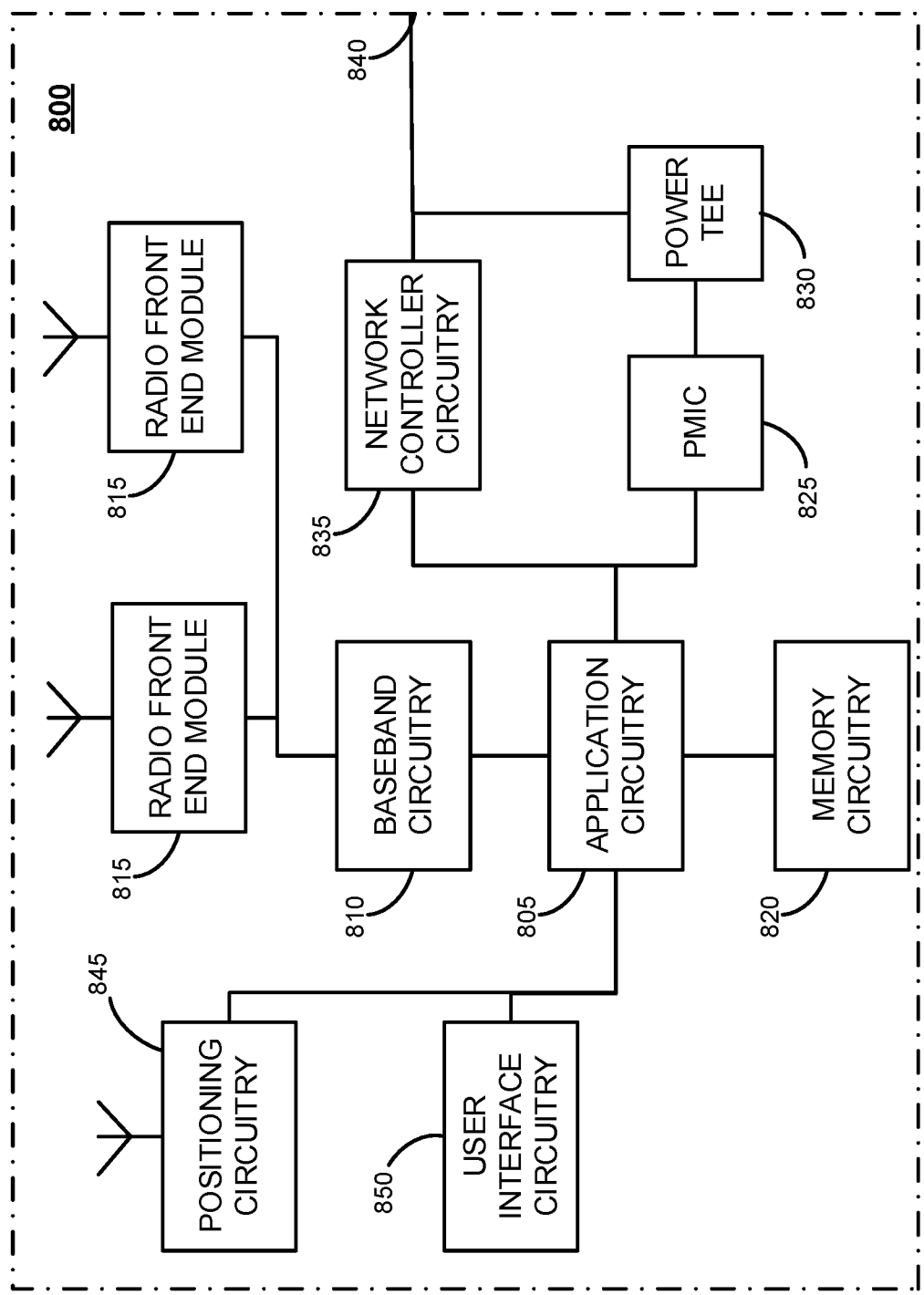
FIG. 8 illustrates an example of infrastructure equipment, in accordance with various embodiments.

FIG. 8 illustrates an example of infrastructure equipment 800 in accordance with various embodiments. The infrastructure equipment 800 (or "system 800") may be implemented as a base station, radio head, RAN node, etc., such as the RAN nodes 511 and/or AP 506 shown and described previously. In other examples, the system 800 could be implemented in or by a UE, application server(s) 530, and/or any other element/device discussed herein. The system 800 may include one or more of application circuitry 805, baseband circuitry 810, one or more radio front end modules 815, memory 820, power management integrated circuitry (PMIC) 825, power tee circuitry 830, network controller 835, network interface connector 840, satellite positioning circuitry 845, and user interface 850. In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 520 (or CN 70 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 805 may include one or more central processing unit (CPU) cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 805 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 800 may not utilize application circuitry 805, and instead may include a special-purpose processor/controller to process IP data received from an EPC or 5GC, for example.

Additionally or alternatively, application circuitry 805 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric including and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. Although not shown, baseband circuitry 810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

User interface circuitry 850 may include one or more user interfaces designed to enable user interaction with the system 800 or peripheral component interfaces designed to enable peripheral component interaction with the system 800. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 815 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 815. The RFEMs 815 may incorporate both millimeter wave antennas and sub-millimeter wave antennas.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocols. In some implementations, the network controller circuitry 835 may include multiple controllers to provide connectivity to other networks using the same or different protocols.

The positioning circuitry 845, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation (s) ("GNSS nodes") may provide positioning services by continuously transmitting or broadcasting GNSS signals along a line of sight, which may be used by GNSS receivers (e.g., positioning circuitry 845 and/or positioning circuitry implemented by UEs 501, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 845 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 845 may provide data to application circuitry 805 which may include one or more of position data or time data. Application circuitry 805 may use the time data to synchronize operations with other radio base stations (e.g., RAN nodes 511 or the like).

The components shown by FIG. 8 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I²C interface, an SPI interface, point to point interfaces, and a power bus, among others.

Figure 9:
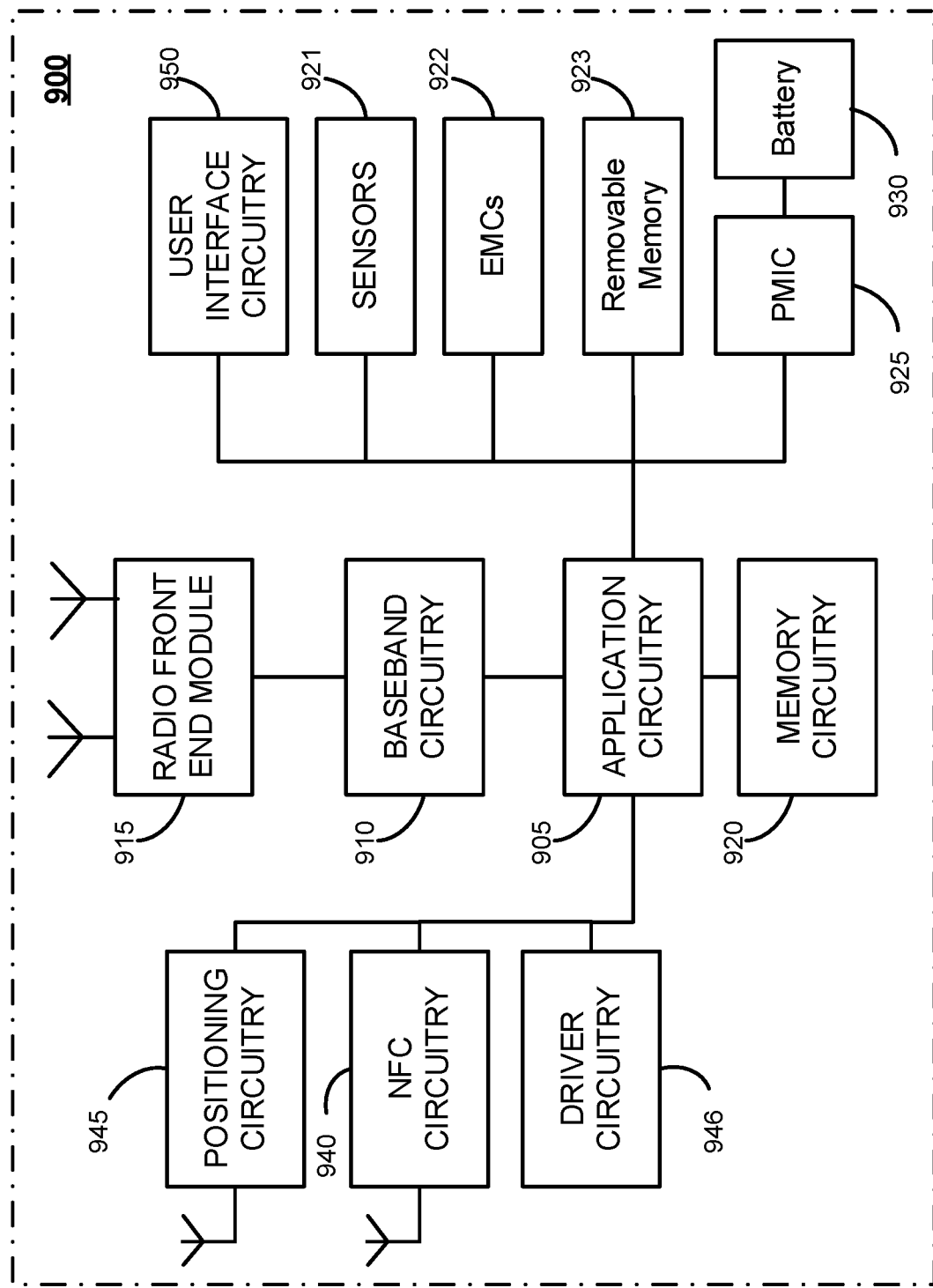
FIG. 9 illustrates an example of a platform, in accordance with various embodiments.

FIG. 9 illustrates an example of a platform 900 (or "device 900") in accordance with various embodiments. In embodiments, the computer platform 900 may be suitable for use as UEs 501, 601, application servers 530, and/or any other element/device discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

The application circuitry 905 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 900. In some embodiments, processors of application circuitry 805/905 may process IP data packets received from an EPC or 5GC.

Application circuitry 905 be or include a microprocessor, a multi-core processor, a multithreaded processor, an ultra-low voltage processor, an embedded processor, or other known processing element. In one example, the application circuitry 905 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 905 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 905 may be a part of a system on a chip (SoC) in which the application circuitry 905 and other components are formed into a single integrated circuit, or a single package, such as the Edison™ or Galileo™ SoC boards from Intel® Corporation.

Additionally or alternatively, application circuitry 905 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 905 may comprise logic blocks or logic fabric including and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), antifuses, etc.) used to store logic blocks, logic fabric, data, etc. in lookup-tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits. Although not shown, baseband circuitry 910 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

The radio front end modules (RFEMs) 915 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 915. The RFEMs 915 may incorporate both millimeter wave antennas and sub-millimeter wave antennas.

The memory circuitry 920 may include any number and type of memory devices used to provide for a given amount of system memory. As examples, the memory circuitry 920 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 920 may be developed in accordance with a Joint Electron Devices Engineering Council (JEDEC) low power double data rate (LPDDR)-based design, such as LPDDR2, LPDDR3, LPDDR4, or the like. Memory circuitry 920 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 920 may be on-die memory or registers associated with the application circuitry 905. To provide for persistent storage of information such as data, applications, operating systems and so forth, memory circuitry 920 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 900 may incorporate the three-dimensional (3D) cross-point (XPOINT) memories from Intel® and Micron®.

Removable memory circuitry 923 may include devices, circuitry, enclosures/housings, ports or receptacles, etc. used to coupled portable data storage devices with the platform 900. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 900 may also include interface circuitry (not shown) that is used to connect external devices with the platform 900. The external devices connected to the platform 900 via the interface circuitry may include sensors 921, such as accelerometers, level sensors, flow sensors, temperature sensors, pressure sensors, barometric pressure sensors, and the like. The interface circuitry may be used to connect the platform 900 to electro-mechanical components (EMCs) 922, which may allow platform 900 to change its state, position, and/or orientation, or move or control a mechanism or system. The EMCs 922 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 900 may be configured to operate one or more EMCs 922 based on one or more captured events and/or instructions or control signals received from a service provider and/or various clients.

In some implementations, the interface circuitry may connect the platform 900 with positioning circuitry 945, which may be the same or similar as the positioning circuitry 845 discussed with regard to FIG. 8.

In some implementations, the interface circuitry may connect the platform 900 with near-field communication (NFC) circuitry 940, which may include an NFC controller coupled with an antenna element and a processing device. The NFC circuitry 940 may be configured to read electronic tags and/or connect with another NFC-enabled device.

The driver circuitry 946 may include software and hardware elements that operate to control particular devices that are embedded in the platform 900, attached to the platform 900, or otherwise communicatively coupled with the platform 900. The driver circuitry 946 may include individual drivers allowing other components of the platform 900 to interact or control various input/output (I/O) devices that may be present within, or connected to, the platform 900. For example, driver circuitry 946 may include a display driver to control and allow access to a display device, a touchscreen driver to control and allow access to a touchscreen interface of the platform 900, sensor drivers to obtain sensor readings of sensors 921 and control and allow access to sensors 921, EMC drivers to obtain actuator positions of the EMCs 922 and/or control and allow access to the EMCs 922, a camera driver to control and allow access to an embedded image capture device, audio drivers to control and allow access to one or more audio devices.

The power management integrated circuitry (PMIC) 925 (also referred to as "power management circuitry 925") may manage power provided to various components of the platform 900. In particular, with respect to the baseband circuitry 910, the PMIC 925 may control power-source selection, voltage scaling, battery charging, or DC-to-DC conversion. The PMIC 925 may often be included when the platform 900 is capable of being powered by a battery 930, for example, when the device is included in a UE 501, 601.

In some embodiments, the PMIC 925 may control, or otherwise be part of, various power saving mechanisms of the platform 900. For example, if the platform 900 is in an RRC_Connected state, where it is still connected to the RAN node as it expects to receive traffic shortly, then it may enter a state known as Discontinuous Reception Mode (DRX) after a period of inactivity. During this state, the platform 900 may power down for brief intervals of time and thus save power. If there is no data traffic activity for an extended period of time, then the platform 900 may transition off to an RRC_Idle state, where it disconnects from the network and does not perform operations such as channel quality feedback, handover, etc. The platform 900 goes into a very low power state and it performs paging where again it periodically wakes up to listen to the network and then powers down again. The platform 900 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 930 may power the platform 900, although in some examples the platform 900 may be mounted deployed in a fixed location, and may have a power supply coupled to an electrical grid. The battery 930 may be a lithium ion battery, a metal-air battery, such as a zinc-air battery, an aluminum-air battery, a lithium-air battery, and the like. In some implementations, such as in V2X applications, the battery 930 may be a typical lead-acid automotive battery.

In some implementations, the battery 930 may be a "smart battery," which includes or is coupled with a Battery Management System (BMS) or battery monitoring integrated circuitry. The BMS may be included in the platform 900 to track the state of charge (SoCh) of the battery 930. The BMS may be used to monitor other parameters of the battery 930 to provide failure predictions, such as the state of health (SoH) and the state of function (SoF) of the battery 930. The BMS may communicate the information of the battery 930 to the application circuitry 905 or other components of the platform 900. The BMS may also include an analog-to-digital (ADC) convertor that allows the application circuitry 905 to directly monitor the voltage of the battery 930 or the current flow from the battery 930. The battery parameters may be used to determine actions that the platform 900 may perform, such as transmission frequency, network operation, sensing frequency, and the like.

A power block, or other power supply coupled to an electrical grid may be coupled with the BMS to charge the battery 930. In some examples, the power block 528 may be replaced with a wireless power receiver to obtain the power wirelessly, for example, through a loop antenna in the computer platform 900. In these examples, a wireless battery charging circuit may be included in the BMS. The specific charging circuits chosen may depend on the size of the battery 930, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 900 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an $I^2C$ interface, an SPI interface, point to point interfaces, and a power bus, among others.

Figure 10:
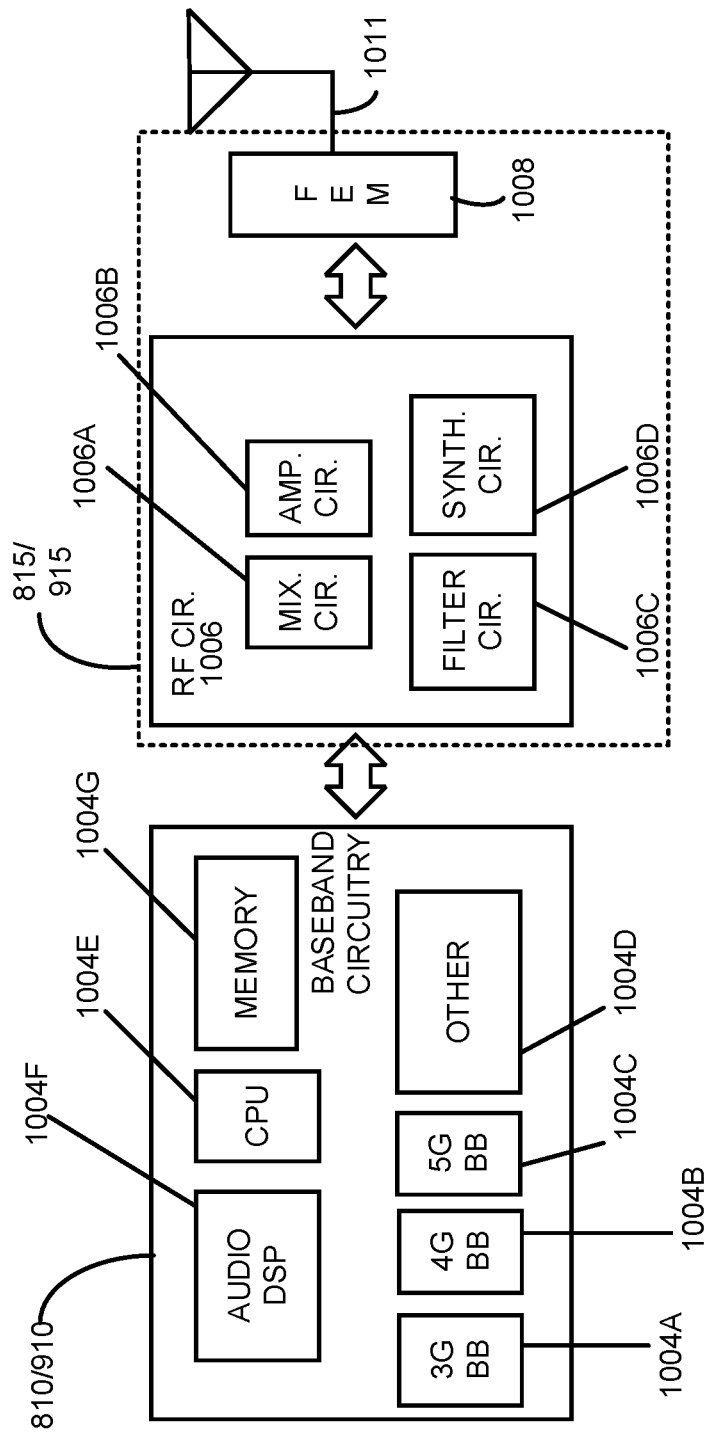
FIG. 10 illustrates example components of baseband circuitry, in accordance with various embodiments.

FIG. 10 illustrates example components of baseband circuitry 810/910 and radio front end modules (RFEM) 815/915 in accordance with various embodiments. As shown, the RFEM 815/915 may include Radio Frequency (RF) circuitry 1006, front-end module (FEM) circuitry 1008, one or more antennas 1011 coupled together at least as shown.

The baseband circuitry 810/910 may include circuitry such as, but not limited to, one or more single-core or multi-core processors. The baseband circuitry 810/910 may include one or more baseband processors or control logic to process baseband signals received from a receive signal path of the RF circuitry 1006 and to generate baseband signals for a transmit signal path of the RF circuitry 1006. Baseband processing circuitry 810/910 may interface with the application circuitry 805/905 for generation and processing of the baseband signals and for controlling operations of the RF circuitry 1006. For example, in some embodiments, the baseband circuitry 810/910 may include a third generation (3G) baseband processor 1004A, a fourth generation (4G) baseband processor 1004B, a fifth generation (5G) baseband processor 1004C, or other baseband processor(s) 1004D for other existing generations, generations in development or to be developed in the future (e.g., second generation (2G), si10h generation (6G), etc.). The baseband circuitry 810/910 (e.g., one or more of baseband processors 1004A-D) may handle various radio control functions that enable communication with one or more radio networks via the RF circuitry 1006. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, etc. In some embodiments, modulation/demodulation circuitry of the baseband circuitry 810/910 may include Fast-Fourier Transform (FFT), precoding, or constellation mapping/demapping functionality. In some embodiments, encoding/decoding circuitry of the baseband circuitry 810/910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 810/910 may include one or more audio digital signal processor(s) (DSP) 1004F. The audio DSP(s) 1004F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 810/910 and the application circuitry 805/905 may be implemented together such as, for example, on a system on a chip (SOC).

In some embodiments, the baseband circuitry 810/910 may provide for communication compatible with one or more radio technologies. For example, in some embodiments, the baseband circuitry 810/910 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 810/910 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 810/910. RF circuitry 1006 may also include a transmit signal path which may include circuitry to up-convert baseband signals provided by the baseband circuitry 810/910 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 810/910 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 810/910 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 810/910 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 810/910 or the applications processor 805/905 depending on the desired output frequency. In some embodiments, a divider control input (e.g., N) may be determined from a look-up table based on a channel indicated by the applications processor 805/905.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1011, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1011. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1011).

Processors of the application circuitry 805/905 and processors of the baseband circuitry 810/910 may be used to execute elements of one or more instances of a protocol stack. For example, processors of the baseband circuitry 810/910, alone or in combination, may be used execute Layer 3, Layer 2, or Layer 1 functionality, while processors of the baseband circuitry 810/910 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
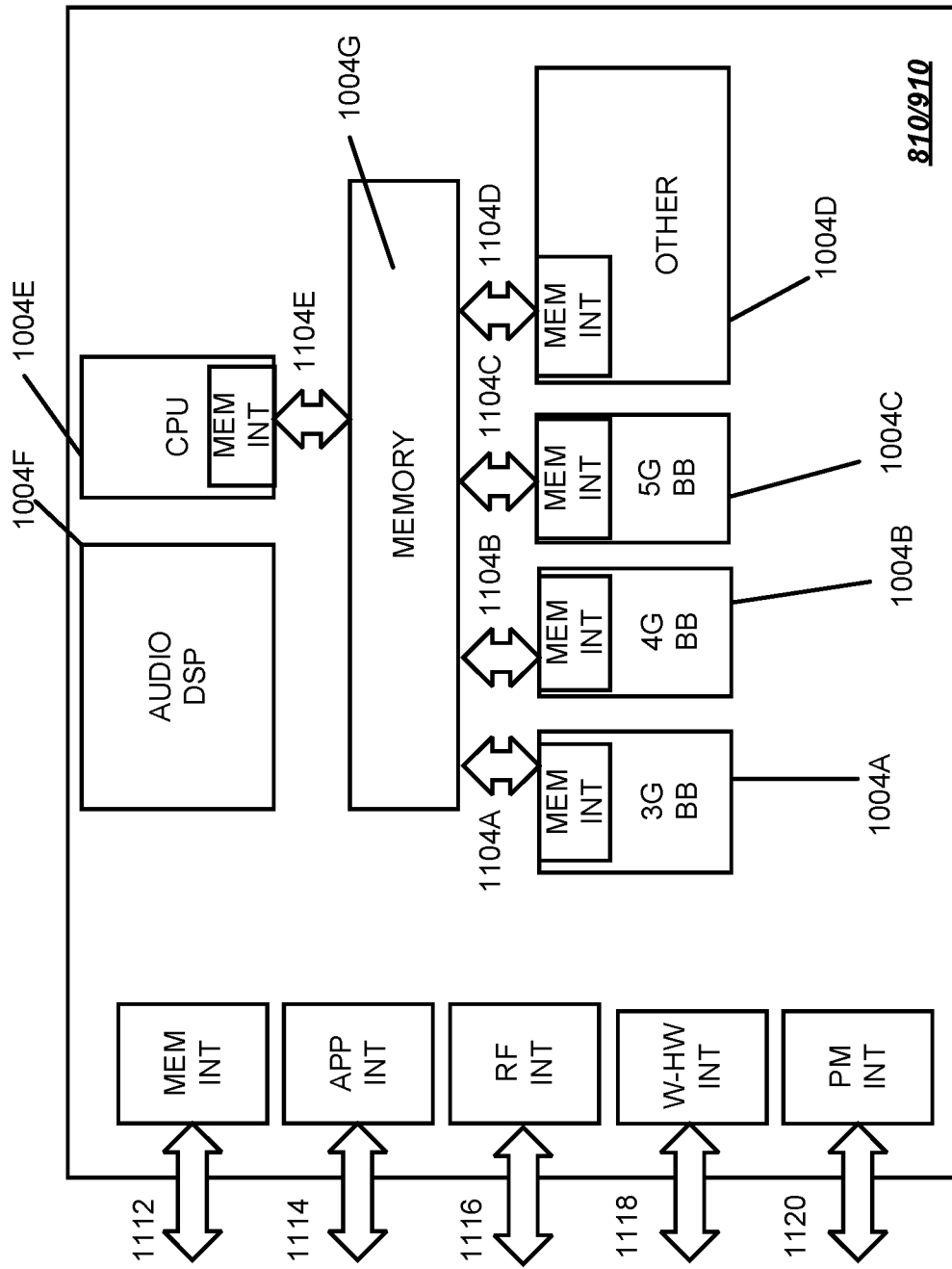
FIG. 11 illustrates example interfaces of baseband circuitry, in accordance with various embodiments.

FIG. 11 illustrates example interfaces of baseband circuitry in accordance with various embodiments. As discussed above, the baseband circuitry 810/910 of FIGS. 8, 9, and 10 may comprise processors 1004A-1004E and a memory 1004G utilized by said processors. Each of the processors 1004A-1004E may include a memory interface, 1104A-1104E, respectively, to send/receive data to/from the memory 1004G.

The baseband circuitry 810/910 may further include one or more interfaces to communicatively couple to other circuitries/devices, such as a memory interface 1112 (e.g., an interface to send/receive data to/from memory external to the baseband circuitry 810/910), an application circuitry interface 1114 (e.g., an interface to send/receive data to/from the application circuitry 805/905 of FIGS. 8-10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMIC 925.

Figure 12:
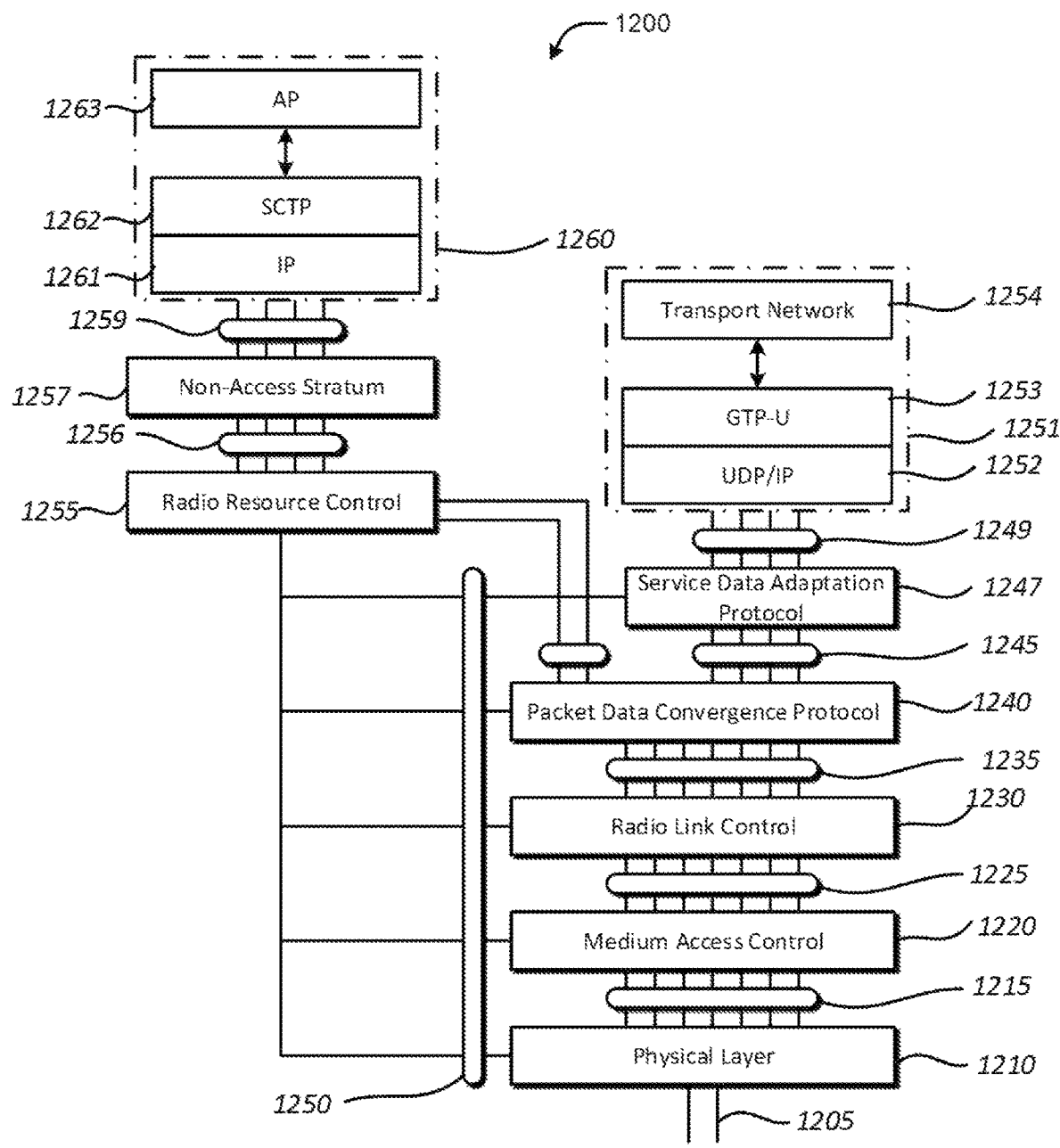
FIG. 12 illustrates various protocol functions that may be implemented in a wireless communication device, in accordance with various embodiments.

FIG. 12 illustrates various protocol functions that may be implemented in a wireless communication device according to various embodiments. In particular, FIG. 12 includes an arrangement 1200 showing interconnections between various protocol layers/entities. The following description of FIG. 12 is provided for various protocol layers/entities that operate in conjunction with the Fifth Generation (5G) or New Radio (NR) system standards and LTE system standards, but some or all of the aspects of FIG. 12 may be applicable to other wireless communication network systems as well.

The protocol layers of arrangement 1200 may include one or more of a physical layer (PHY) 1210, a medium access control layer (MAC) 1220, a radio link control layer (RLC) 1230, a packet data convergence protocol layer (PDCP) 1240, a service data adaptation protocol layer (SDAP) 1247, a radio resource control layer (RRC) 1255, and a non-access stratum (NAS) layer 1257, in addition to other higher layer functions not illustrated. The protocol layers may include one or more service access points (e.g., items 1259, 1256, 1250, 1249, 1245, 1235, 1225, and 1215 in FIG. 12) that may provide communication between two or more protocol layers.

The PHY 1210 may transmit and receive physical layer signals 1205 that may be received from or transmitted to one or more other communication devices. The physical layer signals 1205 may comprise one or more physical channels, such as those discussed herein. The PHY 1210 may further perform link adaptation or adaptive modulation and coding (AMC), power control, cell search (e.g., for initial synchronization and handover purposes), and other measurements used by higher layers, such as the RRC 1255. The PHY 1210 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing. In embodiments, an instance of PHY 1210 may process requests from and provide indications to an instance of MAC 1220 via one or more physical layer service access points (PHY-SAP) 1215. According to some embodiments, requests and indications communicated via PHY-SAP 1215 may comprise one or more transport channels.

Instance(s) of MAC 1220 may process requests from, and provide indications to an instance of RLC 1230 via one or more medium access control service access points (MAC-SAP) 1225. These requests and indications communicated via the MAC-SAP 1225 may comprise one or more logical channels. The MAC 1220 may perform mapping between the logical channels and transport channels, multiplexing of MAC SDUs from one or more logical channels onto transport blocks (TB) to be delivered to PHY 1210 via the transport channels, de-multiplexing MAC SDUs to one or more logical channels from TBs delivered from the PHY 1210 via transport channels, multiplexing MAC SDUs onto TBs, scheduling information reporting, error correction through hybrid automatic repeat request (HARD), and logical channel prioritization.

Instance(s) of RLC 1230 may process requests from and provide indications to an instance of PDCP 1240 via one or more radio link control service access points (RLC-SAP) 1235. These requests and indications communicated via RLC-SAP 1235 may comprise one or more RLC channels. The RLC 1230 may operate in a plurality of modes of operation, including: Transparent Mode™, Unacknowledged Mode (UM), and Acknowledged Mode (AM). The RLC 1230 may execute transfer of upper layer protocol data units (PDUs), error correction through automatic repeat request (ARQ) for AM data transfers, and concatenation, segmentation and reassembly of RLC SDUs for UM and AM data transfers. The RLC 1230 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1240 may process requests from and provide indications to instance(s) of RRC 1255 and/or instance(s) of SDAP 1247 via one or more packet data convergence protocol service access points (PDCP-SAP) 1245. These requests and indications communicated via PDCP-SAP 1245 may comprise one or more radio bearers. The PDCP layer 1204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1247 may process requests from and provide indications to one or more higher layer protocol entities via one or more service data adaptation protocol service access points (SDAP-SAP) 1249. These requests and indications communicated via SDAP-SAP 1249 may comprise one or more quality of service (QoS) flows. The SDAP 1247 may map QoS flows to data radio bearers (DRBs), and vice versa, and may also mark QoS flow IDs (QFIs) in DL and UL packets. A single SDAP entity 1247 may be configured for an individual PDU session. In the UL direction, the NG-RAN 520 may control the mapping of QoS Flows to DRB(s) in two different ways, reflective mapping or explicit mapping. For reflective mapping, the SDAP 1247 of a UE 501 may monitor the QoS flow ID(s) of the DL packets for each DRB, and may apply the same mapping for packets flowing in the UL direction. For a DRB, the SDAP 1247 of the UE 501 may map the UL packets belonging to the QoS flows(s) corresponding to the QoS flow ID(s) and PDU Session observed in the DL packets for that DRB. To enable reflective mapping, the NG-RAN 710 may mark DL packets over the Uu interface with a QoS flow ID. The explicit mapping may involve the RRC 1255 configuring the SDAP 1247 with an explicit QoS flow to DRB mapping rule, which may be stored and followed by the SDAP 1247. In embodiments, the SDAP 1247 may only be used in NR implementations and may not be used in LTE implementations.

The RRC 1255 may configure, via one or more management service access points (M-SAP), aspects of one or more protocol layers, which may include one or more instances of PHY 1210, MAC 1220, RLC 1230, PDCP 1240 and SDAP 1247. In embodiments, an instance of RRC 1255 may process requests from and provide indications to one or more NAS entities 1257 via one or more RRC service access points (RRC-SAP) 1256. The main services and functions of the RRC 1255 may include broadcast of system information (e.g., included in Master Information Blocks (MIBs) or System Information Blocks (SIBs) related to the NAS), broadcast of system information related to the access stratum (AS), paging, establishment, maintenance and release of an RRC connection between the UE 501 and RAN 520 (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The NAS 1257 may form the highest stratum of the control plane between the UE 501 and the AMF 721. The NAS 1257 may support the mobility of the UEs 501 and the session management procedures to establish and maintain IP connectivity between the UE 101 and a P-GW in LTE systems.

According to various embodiments, one or more protocol entities of arrangement 1200 may be implemented in UEs 501, RAN nodes 511, AMF 721 in NR implementations or MME 621 in LTE implementations, UPF 702 in NR implementations or S-GW 622 and P-GW 623 in LTE implementations, or the like to be used for control plane or user plane communications protocol stack between the aforementioned devices. In such embodiments, one or more protocol entities that may be implemented in one or more of UE 501, gNB 511, AMF 721, etc. may communicate with a respective peer protocol entity that may be implemented in or on another device using the services of respective lower layer protocol entities to perform such communication. In some embodiments, a gNB-central unit (gNB-CU) of the gNB 511 may host the RRC 1255, SDAP 1247, and PDCP 1240 of the gNB that controls the operation of one or more gNB-distributed units (DUs), and the gNB-DUs of the gNB 511 may each host the RLC 1230, MAC 1220, and PHY 1210 of the gNB 511.

In a first example, a control plane protocol stack may comprise, in order from highest layer to lowest layer, NAS 1257, RRC 1255, PDCP 1240, RLC 1230, MAC 1220, and PHY 1210. In this example, upper layers 1260 may be built on top of the NAS 1257, which includes an internet protocol layer (IP) 1261, an Stream Control Transmission Protocol layer (SCTP) 1262, and an application layer signaling protocol (AP) 1263.

In NR implementations, the AP 1263 may be an NG application protocol layer (NGAP or NG-AP) 1263 for the NG interface 513 defined between the NG-RAN node 511 and the AMF 721, or the AP 1263 may be an Xn application protocol layer (XnAP or Xn-AP) 1263 for the Xn interface 512 that is defined between two or more RAN nodes 511.

The NG-AP 1263 may support the functions of the NG interface 513 and may comprise Elementary Procedures (EPs). An NG-AP EP may be a unit of interaction between the NG-RAN node 511 and the AMF 721. The NG-AP 1263 services may comprise two groups: UE-associated services (e.g., services related to a UE 101, 102) and non-UE-associated services (e.g., services related to the whole NG interface instance between the NG-RAN node 511 and AMF 721). These services may include functions including, but not limited to: a paging function for the sending of paging requests to NG-RAN nodes 511 involved in a particular paging area; UE Context management function for allowing the AMF 721 to establish, modify, and/or release a UE Context in the AMF 721 and the NG-RAN node 511; mobility function for UEs 501 in ECM-CONNECTED mode for intra-system HOs to support mobility within NG-RAN and inter-system HOs to support mobility from/to EPS systems; NAS Signaling Transport function for transporting or rerouting NAS messages between UE 501 and AMF 721; a NAS node selection function for determining an association between the AMF 721 and the UE 501; NG interface management function(s) for setting up the NG interface and monitoring for errors over the NG interface; warning message transmission function provides means to transfer warning messages via NG interface or cancel ongoing broadcast of warning messages; Configuration Transfer function for requesting and transferring of RAN configuration information (e.g., Self-Organizing Network (SON) information, performance measurement (PM) data, etc.) between two RAN nodes 511 via CN 520; and/or other like functions.

The XnAP 1263 may support the functions of the Xn interface 512 and may comprise XnAP basic mobility procedures and XnAP global procedures. The XnAP basic mobility procedures may comprise procedures used to handle UE mobility within the NG RAN 520 (or E-UTRAN 520), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 501, such as Xn interface setup and reset procedures, NG-RAN update procedures, cell activation procedures, and the like.

In LTE implementations, the AP 1263 may be an S1 Application Protocol layer (S1-AP) 1263 for the S1 interface 513 defined between an E-UTRAN node 511 and an MME, or the AP 1263 may be an X2 application protocol layer (X2AP or X2-AP) 1263 for the X2 interface 512 that is defined between two or more E-UTRAN nodes 511.

The S1 Application Protocol layer (S1-AP) 1263 may support the functions of the S1 interface, and similar to the NG-AP discussed previously, the S1-AP may comprise S1-AP EPs. An S1-AP EP may be a unit of interaction between the E-UTRAN node 511 and an MME 621 within an LTE CN 520. The S1-AP 1263 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1263 may support the functions of the X2 interface 512 and may comprise X2AP basic mobility procedures and X2AP global procedures. The X2AP basic mobility procedures may comprise procedures used to handle UE mobility within the E-UTRAN 520, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 501, such as X2 interface setup and reset procedures, load indication procedures, error indication procedures, cell activation procedures, and the like.

The SCTP layer (alternatively referred to as the SCTP/IP layer) 1262 may provide guaranteed delivery of application layer messages (e.g., NGAP or XnAP messages in NR implementations, or S1-AP or X2AP messages in LTE implementations). The SCTP 1262 may ensure reliable delivery of signaling messages between the RAN node 511 and the AMF 721/MME 621 based, in part, on the IP protocol, supported by the IP 1261. The Internet Protocol layer (IP) 1261 may be used to perform packet addressing and routing functionality. In some implementations the IP layer 1261 may use point-to-point transmission to deliver convey PDUs. In this regard, the RAN node 511 may comprise L2 and L1 layer communication links (e.g., wired or wireless) with the MME/AMF to exchange information.

In a second example, a user plane protocol stack may comprise, in order from highest layer to lowest layer, SDAP 1247, PDCP 1240, RLC 1230, MAC 1220, and PHY 1210. The user plane protocol stack may be used for communication between the UE 501, the RAN node 511, and UPF 702 in NR implementations or an S-GW ZR122 and P-GW 623 in LTE implementations. In this example, upper layers 1251 may be built on top of the SDAP 1247, and may include a user datagram protocol (UDP) and IP security layer (UDP/IP) 1252, a General Packet Radio Service (GPRS) Tunneling Protocol for the user plane layer (GTP-U) 1253, and a User Plane Protocol Data Unit layer (UP PDU) 1263.

The transport network layer 1254 (also referred to as a "transport layer") may be built on IP transport, and the GTP-U 1253 may be used on top of the UDP/IP layer 703 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1253 may be used for carrying user data within the GPRS core network and between the radio access network and the core network. The user data transported can be packets in any of IPv4, IPv6, or PPP formats, for example. The UDP/IP 1252 may provide checksums for data integrity, port numbers for addressing different functions at the source and destination, and encryption and authentication on the selected data flows. The RAN node 511 and the S-GW 622 may utilize an S1-U interface to exchange user plane data via a protocol stack comprising an L1 layer (e.g., PHY 1210), an L2 layer (e.g., MAC 1220, RLC 1230, PDCP 1240, and/or SDAP1240), the UDP/IP layer 1252, and the GTP-U 1253. The S-GW 622 and the P-GW 623 may utilize an S5/S8a interface to exchange user plane data via a protocol stack comprising an L1 layer, an L2 layer, the UDP/IP layer 1252, and the GTP-U 1253. As discussed previously, NAS protocols may support the mobility of the UE 501 and the session management procedures to establish and maintain IP connectivity between the UE 501 and the P-GW 623.

Moreover, although not shown by FIG. 12, an application layer may be present above the AP 1263 and/or the transport network layer 1254. The application layer may be a layer in which a user of the UE 501, RAN node 511, or other network element interacts with software applications being executed, for example, by application circuitry 805 or application circuitry 905, respectively. The application layer may also provide one or more interfaces for software applications to interact with communications systems of the UE 501 or RAN node 511, such as the baseband circuitry 810/910. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 13:
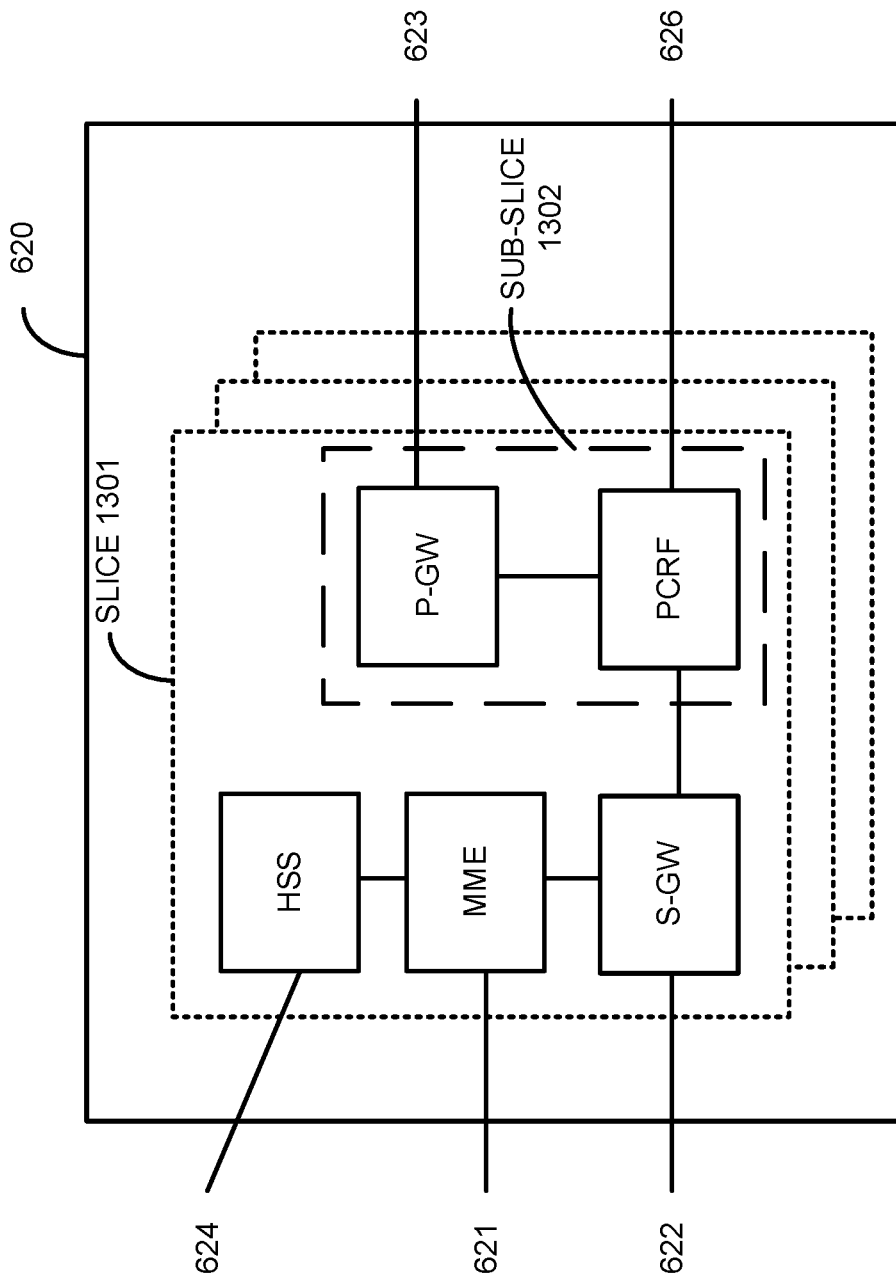
FIG. 13 illustrates components of a core network, in accordance with various embodiments.

FIG. 13 illustrates components of a core network in accordance with various embodiments. The components of the CN 620 may be implemented in one physical node or separate physical nodes including components to read and execute instructions from a machine-readable or computer-readable medium (e.g., a non-transitory machine-readable storage medium). In embodiments, the components of CN 720 may be implemented in a same or similar manner as discussed herein with regard to the components of CN 620. In some embodiments, Network Functions Virtualization (NFV) is utilized to virtualize any or all of the above described network node functions via executable instructions stored in one or more computer readable storage mediums (described in further detail below). A logical instantiation of the CN 620 may be referred to as a network slice 1301, and individual logical instantiations of the CN 620 may provide specific network capabilities and network characteristics. A logical instantiation of a portion of the CN 620 may be referred to as a network sub-slice 1302 (e.g., the network sub-slice 1302 is shown to include the PGW 623 and the PCRF 626).

As used herein, the terms "instantiate", "instantiation", and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to set of network functions (NFs) instances and the resources (e.g., compute, storage, and networking resources) required to deploy the network slice.

With respect to 5G systems (see e.g., FIG. 7), a network slice may include the CN control plane and user plane NFs, NG RANs in a serving PLMN, and a N3IWF functions in the serving PLMN. Individual network slices may have different Single Network Slice Selection Assistance Information (S-NSSAI) and/or may have different Slice/Service Types (SSTs). Network slices may differ for supported features and network functions optimizations, and/or multiple network slice instances may deliver the same service/features but for different groups of UEs (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G access node (AN) and associated with eight different S-NSSAIs. Moreover, an AMF instance serving an individual UE may belong to each of the network slice instances serving that UE.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 14:
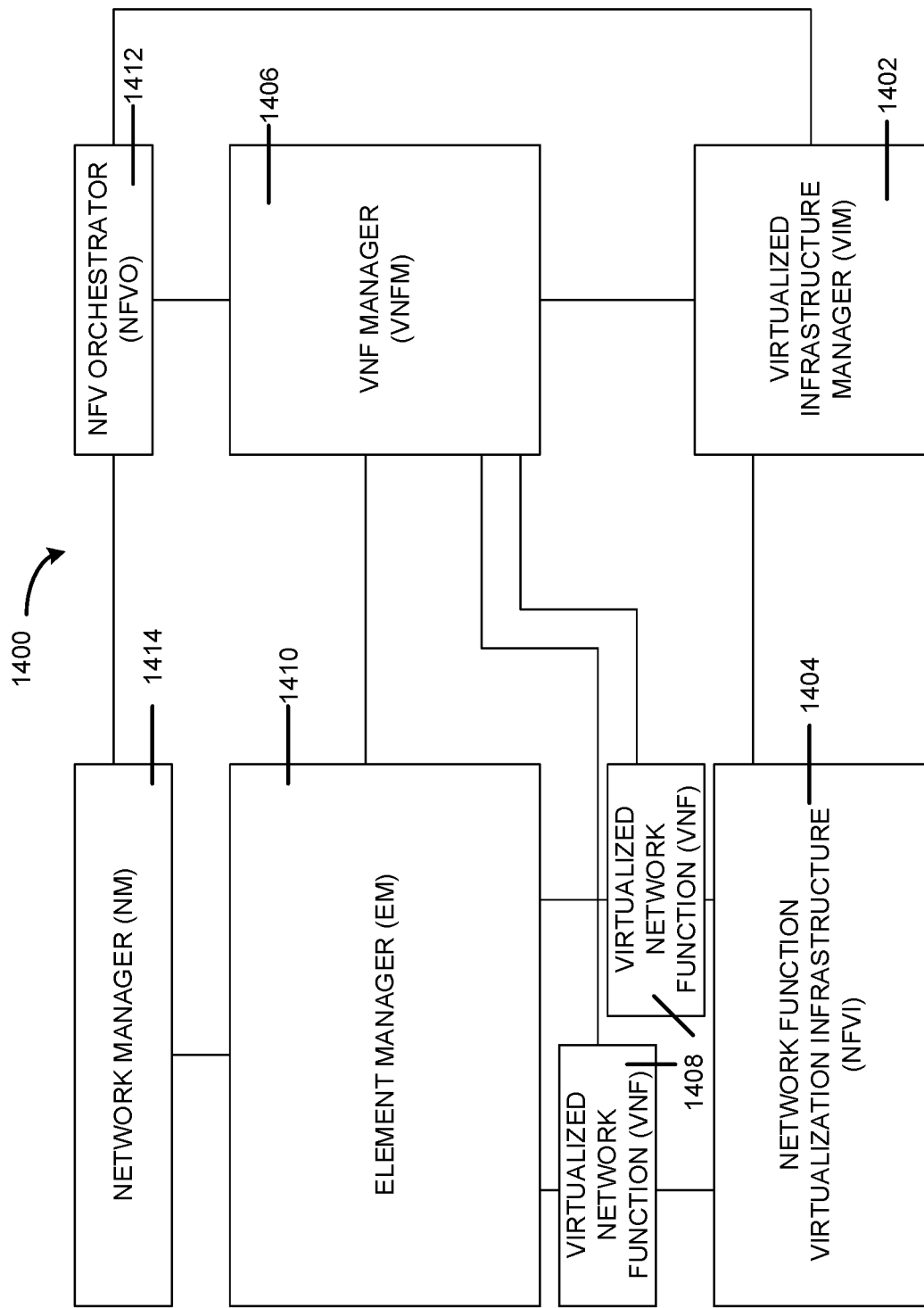
FIG. 14 is a block diagram illustrating components of a system to support network functions virtualization, in accordance with various embodiments.

FIG. 14 is a block diagram illustrating components, according to some example embodiments, of a system 1400 to support NFV. The system 1400 is illustrated as including a virtualized infrastructure manager (VIM) 1402, a network function virtualization infrastructure (NFVI) 1404, a VNF manager (VNFM) 1406, virtualized network functions (VNFs) 1408, an element manager (EM) 1410, an NFV Orchestrator (NFVO) 1412, and a network manager (NM) 1414.

The VIM 1402 manages the resources of the NFVI 1404. The NFVI 1404 can include physical or virtual resources and applications (including hypervisors) used to execute the system 1400. The VIM 1402 may manage the life cycle of virtual resources with the NFVI 1404 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1406 may manage the VNFs 1408. The VNFs 1408 may be used to execute EPC components/functions. The VNFM 1406 may manage the life cycle of the VNFs 1408 and track performance, fault and security of the virtual aspects of VNFs 1408. The EM 1410 may track the performance, fault and security of the functional aspects of VNFs 1408. The tracking data from the VNFM 1406 and the EM 1410 may comprise, for example, performance measurement (PM) data used by the VIM 1402 or the NFVI 1404. Both the VNFM 1406 and the EM 1410 can scale up/down the quantity of VNFs of the system 1400.

The NFVO 1412 may coordinate, authorize, release and engage resources of the NFVI 1404 in order to provide the requested service (e.g., to execute an EPC function, component, or slice). The NM 1414 may provide a package of end-user functions with the responsibility for the management of a network, which may include network elements with VNFs, non-virtualized network functions, or both (management of the VNFs may occur via the EM 1410).

Figure 15:
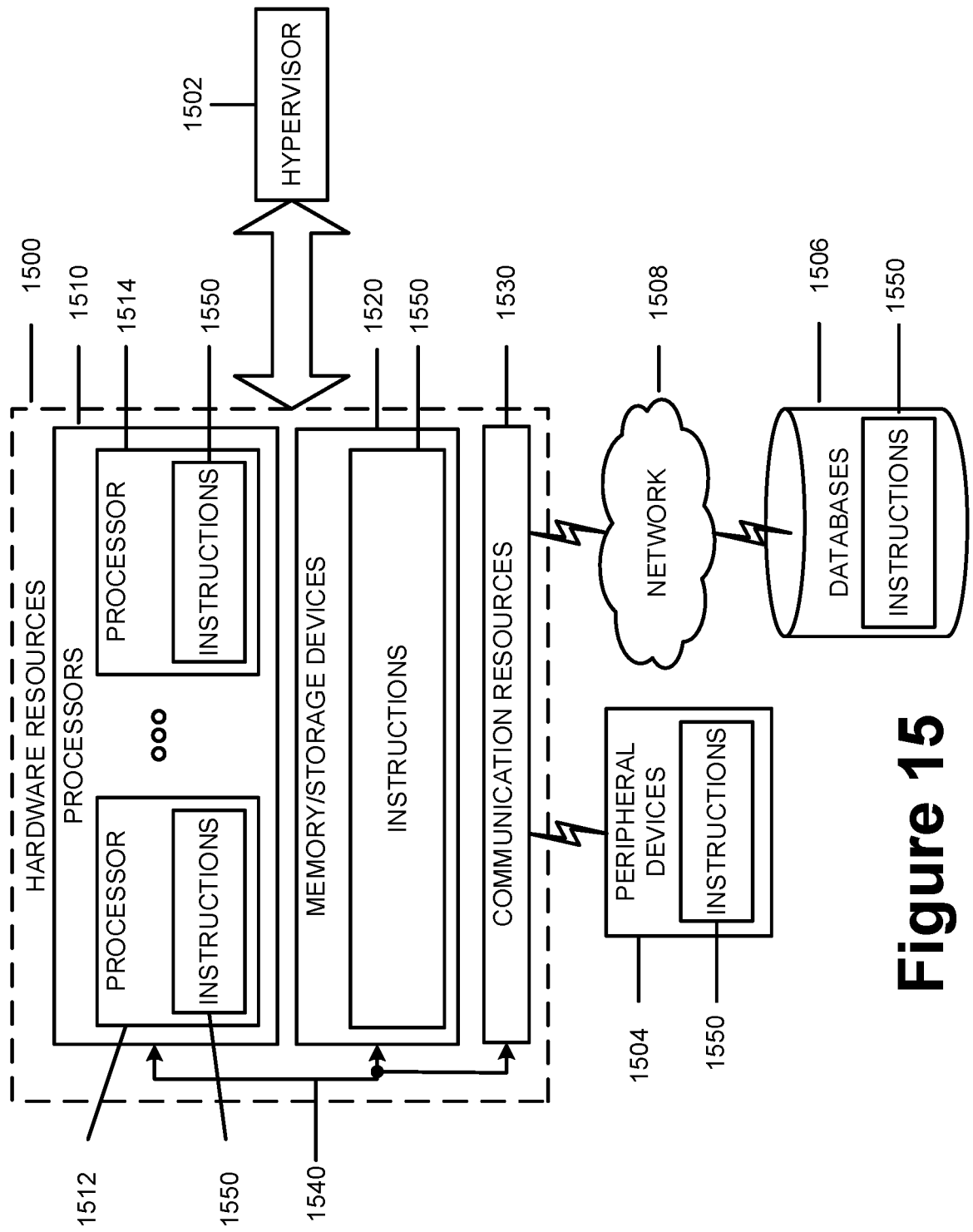
FIG. 15 is a block diagram illustrating components able to read instructions from a machine-readable or computer-readable medium, in accordance with various embodiments.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1502 may be executed to provide an execution environment for one or more network slices/sub-slices to utilize the hardware resources 1500. A "virtualized resource" may refer to compute, storage, and/or network resources provided by virtualization infrastructure to an application, device, system, etc.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514.

The memory/storage devices 1520 may include main memory, disk storage, or any suitable combination thereof. The memory/storage devices 1520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

In embodiments, the devices discussed above with regard to FIGS. 5-15 may perform the various embodiments herein. For example, a vehicle UE indicates a capability of supporting V2X communication over E-UTRA PC5 or NR PC5, supporting V2X communication over Uu (E-UTRA) or NG-Uu (NR) to V2X Control Function via AMF. Based on the capability indication and subscription information, the PCF decides whether to send the corresponding V2X policy/parameters to UE via AMF. In some embodiments, the UE capability may be included in the V2X Policy container which is transparent to AMF. In some embodiments, the UE capability may be included in the Registration Request message or other NAS message. In some embodiments, the V2X policy/parameters may be included in the V2X Policy container which is transparent to AMF. In some embodiments, the V2X policy/parameters are included in the Registration Accept message or other NAS message.

The UE performs V2X policy/parameters and sends the result to AMF. The AMF receives the UE Policy container and the V2X Control Function subscribed to be notified of the reception of the UE Policy container then the AMF forwards the response of the UE to the PCF using Namf_EventExposure including EventID "V2X Policy container received" and EventInformation including the UE V2X Policy container.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method comprising: indicating or causing to indicate, by a UE, a capability of supporting V2X communication over E-UTRA PC5 or NR PC5, supporting V2X communication over Uu (E-UTRA) or NG-Uu (NR) to V2X Control Function via AMF.

Example 2 includes the method of example 1 and/or some other examples herein, wherein based on UE's capability indication and subscription information, the PCF decides whether to send the corresponding V2X policy/parameters to UE via AMF.

Example 3 includes the method of example 1 and/or some other examples herein, wherein the UE capability is included in the V2X Policy container which is transparent to AMF.

Example 4 includes the method of example 1 and/or some other examples herein, wherein the UE capability is included in the Registration Request message or other NAS message.

Example 5 includes the method of example 2 and/or some other examples herein, wherein the V2X policy/parameters are included in the V2X Policy container which is transparent to AMF.

Example 6 includes the method of example 2 and/or some other examples herein, wherein the V2X policy/parameters are included in the Registration Accept message or other NAS message.

Example 7 includes the method of example 2 and/or some other examples herein, wherein the UE performs V2X policy/parameters and sends the result to AMF.

Example 8 includes the method of example 7 and/or some other examples herein, wherein if the AMF receives the UE Policy container and the V2X Control Function subscribed to be notified of the reception of the UE Policy container then the AMF forwards the response of the UE to the PCF using Namf_EventExposure including EventID "V2X Policy container received" and EventInformation including the UE V2X Policy container.

Example 9 may include one or more non-transitory, computer-readable media having instructions that, when executed, cause a user equipment (UE) in a vehicular communication system to: determine a capability of the UE for supporting vehicle-to-everything (V2X) communication over a PC5 interface; generate a message to be transmitted to an access and mobility management function (AMF) to indicate the capability of the UE for supporting V2X communication; and receive at least a V2X policy and V2X parameters for the UE from the AMF, wherein the V2X policy and V2X parameters for the UE are determined based on the capability of the UE for supporting V2X communication.

Example 10 may include the one or more non-transitory computer-readable media of example 9 and/or some other examples herein, wherein the instructions, when executed, further cause the UE to: store the received V2X policy and the V2X parameters; and perform operations associated with the V2X policy and the V2X parameters.

Example 11 may include the one or more non-transitory computer-readable media of example 10 and/or some other examples herein, wherein the instructions, when executed, further cause the UE to: transmit results obtained from the operations performed by the UE to the AMF.

Example 12 may include the one or more non-transitory computer-readable media of example 9 and/or some other examples herein, wherein the instructions, when executed, further cause the UE to: receive a registration accept message from the AMF.

Example 13 may include the one or more non-transitory computer-readable media of example 9 and/or some other examples herein, wherein the PC5 interface is a Long Term Evolution (LTE) PC5 interface or a New Radio (NR) PC5 interface.

Example 14 may include the one or more non-transitory computer-readable media of example 9 and/or some other examples herein, wherein the capability of the UE for supporting V2X communication is included in a registration request message or a non-access stratum (NAS) message.

Example 15 may include the one or more non-transitory computer-readable media of example 9 and/or some other examples herein, wherein the V2X policy and the V2X parameters are received in a V2X Policy container via a downlink (DL) NAS transport message.

Example 16 may include the one or more non-transitory computer-readable media of example 9 and/or some other examples herein, wherein the V2X policy and the V2X parameters for the UE are determined by a Policy Control Function
(PCF) or a V2X Control Function (V2XCF).

Example 17 may include one or more non-transitory, computer-readable media having instructions that, when executed, cause an Access and Mobility Management Function (AMF) to: receive a message from a user equipment (UE) indicating a capability of the UE for supporting vehicle-to-everything (V2X) communication over a PC5 interface; determine whether to provide at least a V2X policy and V2X parameters to the UE based on the capability of the UE for supporting V2X communication, subscription data of the UE, or local policy; obtain the V2X policy and the V2X parameters, wherein the V2X policy and the V2X parameters are determined based on the capability of the UE for supporting V2X communication; and generate one or more messages to provide an indication of the V2X policy and the V2X parameters to the UE.

Example 18 may include the one or more non-transitory computer-readable media of example 17 and/or some other examples herein, wherein the instructions, when executed, further cause the AMF to: retrieve the subscription data of the UE from a Unified Data Management (UDM).

Example 19 may include the one or more non-transitory computer-readable media of example 17 and/or some other examples herein, wherein the instructions, wherein the instructions, when executed, further cause the AMF to: transmit a registration accept message to the UE.

Example 20 may include the one or more non-transitory computer-readable media of example 17 and/or some other examples herein, wherein the instructions, wherein the V2X policy and the V2X parameters for the UE is determined by a Policy Control Function (PCF) or a V2X Control Function (V2XCF).

Example 21 may include the one or more non-transitory computer-readable media of example 20 and/or some other examples herein, wherein the instructions, wherein the instruction, when executed, further cause the AMF to: request, by a parameter request message, the V2XCF or the PCF to provide the V2X policy and the V2X parameters, wherein the parameter request message includes the capability of the UE for supporting V2X communication; and receive the V2X policy and the V2X parameters from the PCF or the V2XCF.

Example 22 may include the one or more non-transitory computer-readable media of example 21 and/or some other examples herein, wherein the instructions, wherein the instructions, when executed, further cause the AMF to: receive results obtained from operations performed by the UE associated with the V2X policy and the V2X parameters.

Example 23 may include the one or more non-transitory computer-readable media of example 22 and/or some other examples herein, wherein the instructions, wherein the instructions, when executed, further cause the AMF to: notify the PCF or the V2XCF the results received from the UE; and forward the received results from the UE to the PCF or the V2XCF by "Namf_EventExposure", wherein EventID includes "V2X Policy container received" and EventInformation includes a UE V2X Policy container.

Example 24 may include the one or more non-transitory computer-readable media of example 17 and/or some other examples herein, wherein the instructions, wherein the PC5 interface is a Long Term Evolution (LTE) PC5 interface or a New Radio (NR) PC5 interface.

Example 25 may include the one or more non-transitory computer-readable media of example 17 and/or some other examples herein, wherein the instructions, wherein the capability of the UE for supporting V2X communication is included in a registration request message or a non-access stratum (NAS) message.

Example 26 may include the one or more non-transitory computer-readable media of example 17 and/or some other examples herein, wherein the instructions, wherein the V2X policy and V2X parameters are transmitted to the UE in a V2X Policy container via a downlink (DL) NAS transport message.

Example 27 may include an apparatus to be used in a user equipment (UE) in a vehicular communication system, the apparatus comprising: processing circuitry to: determine a capability of the UE for supporting vehicle-to-everything (V2X) communication over a PC5 interface; and network circuitry, coupled with the processing circuitry, to: transmit a message to an access and mobility management function (AMF) to indicate the capability of the UE for supporting V2X communication; and receive at least a V2X policy and V2X parameters for the UE from the AMF, wherein the V2X policy and V2X parameters for the UE are determined based on the capability of the UE for supporting V2X communication.

Example 28 may include the apparatus of example 27 and/or some other examples herein, wherein the processing circuitry is further to: store the received V2X policy and the V2X parameters; and perform operations associated with the V2X policy and the V2X parameters.

Example 29 may include the apparatus of example 28 and/or some other examples herein, wherein the network circuitry is further to: transmit results obtained from the operations performed by the UE to the AMF.

Example 30 may include the apparatus of example 27 and/or some other examples herein, wherein the PC5 interface is a Long Term Evolution (LTE) PC5 interface or a New Radio (NR) PC5 interface.

Example 31 may include the apparatus of example 27 and/or some other examples herein, wherein the capability of the UE for supporting V2X communication is included in a registration request message or a non-access stratum (NAS) message.

Example 32 may include the apparatus of example 27 and/or some other examples herein, wherein the V2X policy and the V2X parameters are received in a V2X Policy container via a downlink (DL) NAS transport message.

Example 33 may include the apparatus of example 27 and/or some other examples herein, wherein the V2X policy and the V2X parameters for the UE is determined by a Policy Control Function (PCF) or a V2X Control Function (V2XCF).

Example 34 may include an apparatus comprising means to perform one or more elements of a method described in or related to any of examples 1-33, or any other method or process described herein.

Example 35 may include one or more non-transitory computer-readable media comprising instructions to cause an electronic device, upon execution of the instructions by one or more processors of the electronic device, to perform one or more elements of a method described in or related to any of examples 1-33, or any other method or process described herein.

Example 36 may include an apparatus comprising logic, modules, or circuitry to perform one or more elements of a method described in or related to any of examples 1-33, or any other method or process described herein.

Example 37 may include a method, technique, or process as described in or related to any of examples 1-33, or portions or parts thereof.

Example 38 may include an apparatus comprising: one or more processors and one or more computer readable media comprising instructions that, when executed by the one or more processors, cause the one or more processors to perform the method, techniques, or process as described in or related to any of examples 1-33, or portions thereof.

Example 39 may include a signal as described in or related to any of examples 1-32, or portions or parts thereof.

Example 40 may include a signal in a wireless network as shown and described herein.

Example 41 may include a method of communicating in a wireless network as shown and described herein.

Example 42 may include a system for providing wireless communication as shown and described herein.

Example 43 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media having instructions that, when executed, cause a user equipment (UE) in a vehicular communication system to:
   determine a capability of the UE for supporting vehicle-to-everything (V2X) communication over a PC5 interface;
   transmit a registration request message including a policy container to an access and mobility management function (AMF), wherein the policy container includes an indication of the capability of the UE for supporting V2X communication over the PC5 interface;
   receive a message from the AMF in response to the registration request message transmitted to the AMF, wherein the message includes the policy container; and
   identify at least a V2X policy and V2X parameters for the UE contained in the policy container included in the message from the AMF, wherein the V2X policy and the V2X parameters include configuration parameters for V2X communication over the PC5 interface for the UE, which are determined based on the capability of the UE for supporting V2X communication over the PC5 interface, and wherein the V2X parameters include at least an expiration time for validity of the configuration parameters for V2X communication over the PC5 interface.

2. The one or more non-transitory, computer-readable media of claim 1, wherein the instructions, when executed, further cause the UE to:
   store the received V2X policy and the V2X parameters; and
   perform operations associated with the V2X policy and the V2X parameters.

3. The one or more non-transitory, computer-readable media of claim 2, wherein the instructions, when executed, further cause the UE to:
   transmit results obtained from the operations performed by the UE to the AMF.

4. The one or more non-transitory, computer-readable media of claim 1, wherein the PC5 interface is a Long Term Evolution (LTE) PC5 interface or a New Radio (NR) PC5 interface.

5. The one or more non-transitory, computer-readable media of claim 1, wherein the registration request message is a non-access stratum (NAS) message.

6. The one or more non-transitory, computer-readable media of claim 1, wherein the message received from the AMF is a downlink (DL) NAS transport message.

7. The one or more non-transitory, computer-readable media of claim 1, wherein the V2X policy and the V2X parameters are determined by a Policy Control Function (PCF) or a V2X Control Function (V2XCF).

8. One or more non-transitory, computer-readable media having instructions that, when executed, cause an Access and Mobility Management Function (AMF) to:
   receive a registration request message from a user equipment (UE) including an indication of a capability of the UE for supporting vehicle-to-everything (V2X) communication over a PC5 interface, wherein the indication is included in a policy container;

determine whether to provide at least a V2X policy and V2X parameters including configuration parameters for V2X communication over the PC5 interface to the UE based on the capability of the UE for supporting V2X communication, subscription data of the UE, or local policy;

obtain the V2X policy and the V2X parameters, wherein the V2X policy and the V2X parameters are determined based on the capability of the UE for supporting V2X communication over the PC5 interface, wherein the V2X parameters include at least an expiration time for validity of the configuration parameters for V2X communication over the PC5 interface; and transmit a message to provide an indication of the V2X policy and the V2X parameters to the UE, wherein the V2X policy and V2X parameters are included in the policy container of the message in response to the registration request message received from the UE.

9. The one or more non-transitory, computer-readable media of claim 8, wherein the instructions, when executed, further cause the AMF to:

retrieve the subscription data of the UE from a Unified Data Management (UDM).

10. The one or more non-transitory, computer-readable media of claim 8, wherein the V2X policy and the V2X parameters are determined by a Policy Control Function (PCF) or a V2X Control Function (V2XCF).

11. The one or more non-transitory, computer-readable media of claim 10, wherein the instruction, when executed, further cause the AMF to:

request, by a parameter request message, the V2XCF or the PCF to provide the V2X policy and the V2X parameters, wherein the parameter request message includes the capability of the UE for supporting V2X communication; and receive the V2X policy and the V2X parameters from the PCF or the V2XCF.

12. The one or more non-transitory, computer-readable media of claim 11, wherein the instructions, when executed, further cause the AMF to:

receive results obtained from operations performed by the UE associated with the V2X policy and the V2X parameters.

13. The one or more non-transitory, computer-readable media of claim 12, wherein the instructions, when executed, further cause the AMF to:

notify the PCF or the V2XCF of the results; and forward the results from the UE to the PCF or the V2XCF by "Namf_EventExposure", wherein an EventID includes "V2X Policy container received" and an EventInformation includes a UE V2X Policy container.

14. The one or more non-transitory, computer-readable media of claim 8, wherein the PC5 interface is a Long Term Evolution (LTE) PC5 interface or a New Radio (NR) PC5 interface.

15. The one or more non-transitory, computer-readable media of claim 8, wherein the registration request message is a non-access stratum (NAS) message.

16. The one or more non-transitory, computer-readable media of claim 8, wherein the transmitted message is a downlink (DL) NAS transport message.

17. An apparatus to be used in a user equipment (UE) in a vehicular communication system, the apparatus comprising:

processing circuitry to:
determine a capability of the UE for supporting vehicle-to-everything (V2X) communication over a PC5 interface; and network circuitry, coupled with the processing circuitry, to:
transmit a registration request message including a policy container to an access and mobility management function (AMF), wherein the policy container includes an indication of the capability of the UE for supporting V2X communication over the PC5 interface;

receive a message from the AMF in response to the registration request message sent to the AMF, wherein the message includes the policy container; and identify at least a V2X policy and V2X parameters including configuration parameters for V2X communication over the PC5 interface for the UE contained in the policy container included in the message, wherein the V2X policy and the V2X parameters are determined based on the capability of the UE for supporting V2X communication over the PC5 interface, and wherein the V2X parameters include at least an expiration time for validity of the configuration parameters for V2X communication over the PC5 interface.

18. The apparatus of claim 17, wherein the processing circuitry is further to:

store the V2X policy and the V2X parameters; and perform operations associated with the V2X policy and the V2X parameters.

19. The apparatus of claim 18, wherein the network circuitry is further to:

transmit results obtained from the operations performed by the UE to the AMF.

20. The apparatus of claim 17, wherein the PC5 interface is a Long Term Evolution (LTE) PC5 interface or a New Radio (NR) PC5 interface.

21. The apparatus of claim 17, wherein the registration request message is a non-access stratum (NAS) message.

22. The apparatus of claim 17, wherein the received message is a downlink (DL) NAS transport message.

23. The apparatus of claim 17, wherein the V2X policy and the V2X parameters are determined by a Policy Control Function (PCF) or a V2X Control Function (V2XCF).

\* \* \* \* \*